(12) United States Patent
Hasegawa et al.

(10) Patent No.: US 7,407,902 B2
(45) Date of Patent: Aug. 5, 2008

(54) BISMUTH GLASS COMPOSITION, AND MAGNETIC HEAD AND PLASMA DISPLAY PANEL INCLUDING THE SAME AS SEALING MEMBER

(75) Inventors: Shinya Hasegawa, Ibaraki (JP); Hiroshi Onishi, Hirakata (JP); Mikie Kanai, Moriguchi (JP); Tetsuya Kamimoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 430 days.

(21) Appl. No.: 10/509,491

(22) PCT Filed: Mar. 28, 2003

(86) PCT No.: PCT/JP03/04043

§ 371 (c)(1),
(2), (4) Date: Sep. 29, 2004

(87) PCT Pub. No.: WO03/087001

PCT Pub. Date: Oct. 23, 2003

(65) Prior Publication Data

US 2005/0181927 A1 Aug. 18, 2005

(30) Foreign Application Priority Data

Mar. 29, 2002 (JP) .............................. 2002-096453
Apr. 18, 2002 (JP) .............................. 2002-115831
Dec. 10, 2002 (JP) .............................. 2002-358616

(51) Int. Cl.
*C03C 3/066* (2006.01)
*C03C 3/068* (2006.01)
*C03C 8/24* (2006.01)

(52) U.S. Cl. .............................. 501/15; 501/17; 501/32; 501/78; 501/79; 313/586; 428/810; 428/811.2

(58) Field of Classification Search .................. 501/78, 501/79, 15, 32, 17; 313/586; 428/810, 811.2
See application file for complete search history.

(56) References Cited

U.S. PATENT DOCUMENTS 5,468,695 A 11/1995 Carroll et al.

(Continued)

FOREIGN PATENT DOCUMENTS

JP         06-048767         2/1994

(Continued)

*Primary Examiner*—Karl E Group
(74) *Attorney, Agent, or Firm*—McDermott Will & Emery LLP

(57) ABSTRACT

A Bismuth glass composition including 0.5 to 14 wt % of $SiO_2$, 3 to 15 wt % of $B_2O_3$, 4 to 22 wt % of ZnO, 55 to 90 wt % of $Bi_2O_3$ and 4 wt % or less of $Al_2O_3$, and further including 5 wt % or less of an oxide of Group A, 12 wt % or less of an oxide of Group B and 0.1 to 10 wt % of an oxide of Group C, wherein the oxide of Group A is at least one selected from the group consisting of $Li_2O$, $Na_2O$ and $K_2O$, the oxide of Group B is at least one selected from the group consisting of MgO, CaO, SrO and BaO, and the oxide of Group C is at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

23 Claims, 6 Drawing Sheets

U.S. PATENT DOCUMENTS

| | | |
|---|---|---|
| 5,733,828 A | 3/1998 | Usui et al. |
| 5,753,571 A * | 5/1998 | Donohue .................... 501/77 |
| 6,255,239 B1 * | 7/2001 | Sakoske ..................... 501/77 |
| 6,503,858 B1 * | 1/2003 | Yamamoto et al. ........... 501/32 |
| 6,778,355 B2 * | 8/2004 | Hasegawa et al. .......... 360/125 |

FOREIGN PATENT DOCUMENTS

| | | |
|---|---|---|
| JP | 08-180310 | 7/1996 |
| JP | 09-268026 | 10/1997 |
| JP | 09-278483 | 10/1997 |
| JP | 09-326101 | 12/1997 |
| JP | 2000-128574 | 5/2000 |
| JP | 2001-139345 | 5/2001 |
| JP | 2003-095697 | 4/2003 |
| WO | WO 95/04005 | 2/1995 |

* cited by examiner

F I G. 5
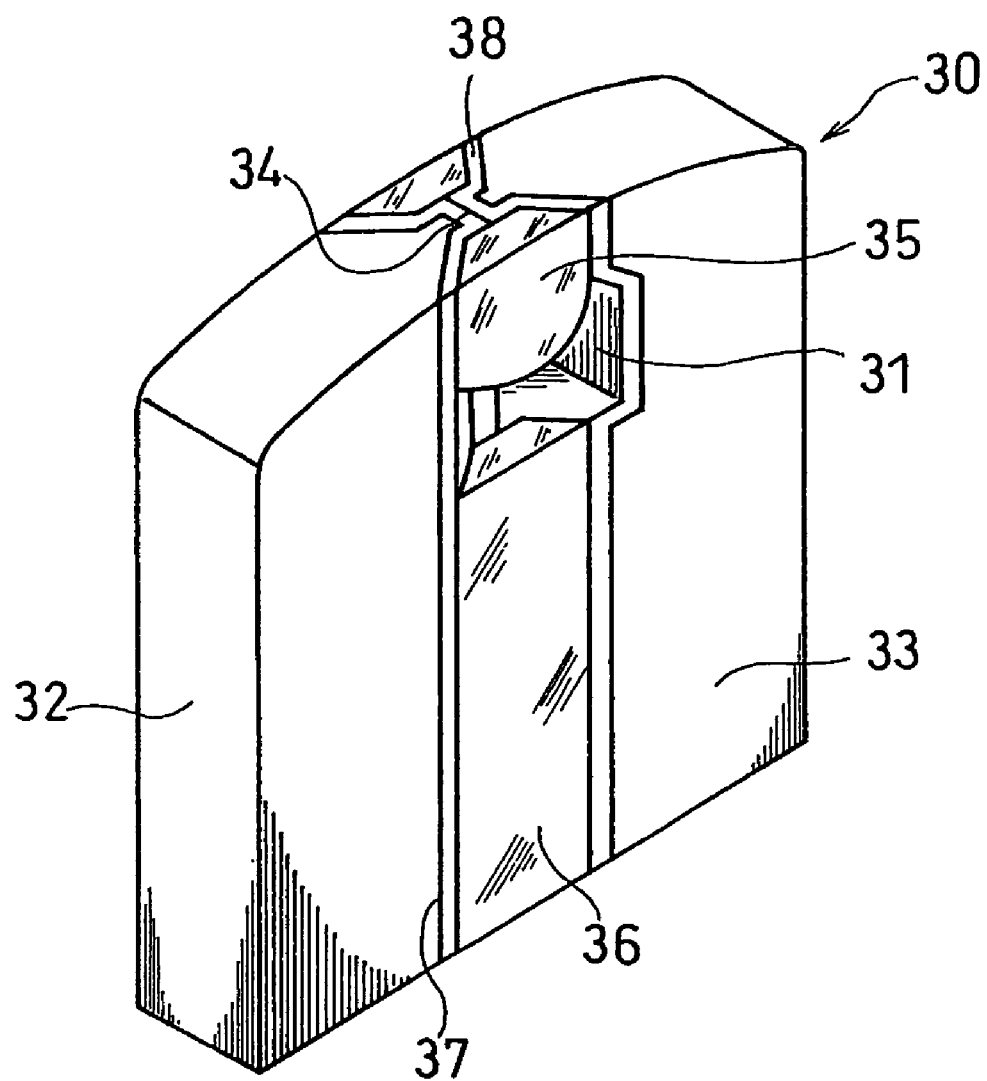

US 7,407,902 B2

BISMUTH GLASS COMPOSITION, AND MAGNETIC HEAD AND PLASMA DISPLAY PANEL INCLUDING THE SAME AS SEALING MEMBER

TECHNICAL FIELD

The present invention relates to a low softening point bismuth glass composition mainly used for bonding, sealing and coating ceramics, glass and metal. The bismuth glass composition of the present invention is suitable for bonding a pair of magnetic core halves of a magnetic head or bonding a front plate and a rear plate of a plasma display panel.

BACKGROUND ART

Ceramics, glass and metal, for example, have been used as materials for electronic equipment and various glass compositions have been used as materials for bonding, sealing or coating them. The glass compositions have various forms such as bulk, powder, fiber and a thin film. There are also a material consisting of the glass composition only, and a composite material comprising a combination of the glass composition and other materials. Further, to give various functions depending on its applications, the glass composition may be dispersed in a vehicle together with other materials and an appropriate filler so that it can be used as a paste. The thus obtained paste may be used as a sealing member for magnetic heads, CRTs, liquid crystal display panels and plasma display panels.

Hereinafter, as a concrete example of applications of the sealing member comprising the glass composition, an explanation is given of the magnetic head and the plasma display panel.

First, a conventional magnetic head is explained.

A magnetic head is a device that performs recording and reproducing of magnetic information to and from a magnetic recording medium. The magnetic head comprises a pair of magnetic core halves, at least one of which being provided with a coil groove, and a magnetic gap member made of a non-magnetic material. The pair of magnetic core halves are abutted to each other via the magnetic gap member and bonded with a sealing member. As such a sealing member, a glass composition is used. The glass composition is an important constituent having an influence even on the properties of the magnetic head.

As a material for the magnetic core halves, ferrite has widely been used due to its excellent magnetic properties, wear resistance and machinability. A magnetic head manufactured with ferrite may be called a ferrite head.

In recent years, according to reduction in size and increase in capacity of the magnetic recording/reproducing device, a magnetic recording medium having high coercivity has come to be used. Aiming at a magnetic head for high density magnetic recording, which is highly capable of writing signals to such a medium, an extension of the ferrite head has been under development.

For example, a magnetic head called an MIG (metal in gap) head is formed by applying magnetic metal films having high saturated magnetic flux density to the surfaces of the magnetic core halves to be opposed to a magnetic gap, abutting the surfaces facing to the magnetic gap to each other via the magnetic gap member, and bonding them with a sealing member. As the magnetic metal film, for example, a thin film of a magnetic metal material such as Fe—Ta—N, Fe—Nb—N, Fe—Nb—Si—B—N, Fe—Ta—C, Co—Ta—Zr—Nb or Co—Nb—Zr—N is used.

There is also a magnetic head comprising magnetic core halves, each of which comprising a magnetic metal film sandwiched between a pair of nonmagnetic substrates. The magnetic core halves are arranged such that the magnetic metal films are abutted at their end faces and bonded with a sealing member via a magnetic gap member. Such a magnetic head is called a stacked head.

In the process of manufacturing the magnetic head, the sealing member is used by softening, liquidizing, cooling and solidifying the glass composition by an appropriate heat treatment. Therefore, to prevent deterioration of the magnetic substance composing the magnetic head by heat, a glass composition usable at a temperature as low as possible has been demanded. As such a glass composition that meets the demand, there is a so-called low softening point glass.

In general, the glass composition is apt to have a higher thermal expansion coefficient when the softening point is lower. However, in order to avoid breaking or cracking due to warpage after cooling, it is necessary to control the thermal expansion coefficient of the sealing member not to increase. Further, to exhibit optimum magnetic recording properties, it is necessary to control the warpage of the magnetic substance caused by a difference in thermal expansion coefficient from the sealing member. Therefore, there has been a demand for a sealing member having a thermal expansion coefficient suitable for the specifications of various magnetic heads.

The sealing members of the magnetic heads are required to have temperature properties and thermal expansion coefficients suitable for their applications, respectively. The sealing member used for the magnetic heads such as the ferrite head, MIG head and stacked head is required to have a working temperature of 450 to 650° C. and a thermal expansion coefficient of $70 \times 10^{-7}$ to $130 \times 10^{-7}$/° C. For example, as to the sealing member for the MIG head, it is preferred that the working temperature is about 500° C. and the thermal expansion coefficient is $75 \times 10^{-7}$ to $100 \times 10^{-7}$/° C.

The working temperature mentioned herein is a temperature at which the viscosity of the glass composition becomes $10^3$ Pa·s. Further, the softening point is a temperature obtained by measurement based on a JIS test method R3103-1, which is determined as a temperature at which the viscosity of the glass composition becomes $10^{6.6}$ Pa·s. With the exception of the case where the viscosity behavior of the glass composition is unique, a glass composition having a low softening point is apt to have a low working temperature.

Next, a common plasma display panel (hereinafter may be referred to as PDP) is explained.

FIG. 1 is an example of a partial schematic oblique view illustrating a major structure of a common PDP.

In FIG. 1, the PDP comprises a front plate 1 and a rear plate 8 bonded to each other.

The front plate 1 includes a front glass substrate 2, display electrodes 5 formed on a single surface thereof, each of which comprising a transparent conductive film 3 and a bus electrode 4, a dielectric layer 6 made of dielectric glass covering the display electrodes 5 and a dielectric layer protecting layer 7 made of magnesium oxide.

The rear plate 8 includes a rear glass substrate 9, address electrodes 10 formed on a single surface thereof, a dielectric layer 11 covering the address electrodes 10, barrier ribs 12 arranged at regular intervals on the top surface of the dielectric layer 11 to form discharge spaces 14 and fluorescent layers formed inside the discharge spaces 14 for color display. The fluorescent layers include a red fluorescent layer 13(R), a green fluorescent layer 13(G) and a blue fluorescent layer 13(B) arranged sequentially, which are excited by ultraviolet light having a short wavelength of 147 nm, for example, to emit light.

The front plate 1 and the rear plate 8 are arranged such that the lengthwise directions of the display electrodes 5 and the address electrodes 10 are orthogonal to each other, and then bonded with a sealing member comprising a glass composition. FIG. 2 shows the arrangement of the display electrodes and the address electrodes, with an illustration of a sealing part.

Referring to FIG. 2, a sealing part 15 is the periphery of an overlapped region between the stacked front plate 1 and the rear plate 8. A paste comprising the sealing member is applied to the sealing part 15 and the front plate 1 and the rear plate 8 are bonded, thereby the inside thereof is sealed. Then, the display electrodes 5 and the address electrodes 10 are connected to external driving circuits (not shown), respectively.

FIG. 3 is an example of a cross section cut along the address electrode of the PDP shown in FIG. 1 illustrating the vicinity of the sealing part.

At least one of the front plate 1 and the rear plate 8 is provided with an air hole 17 for exhausting air from the end of a glass tube 18 communicating with the air hole 17 is fixed to the periphery of the opening end of the air hole 17 with a sealing member 16. Then, while heating to a predetermined temperature, air is exhausted from the inside of the PDP. After the exhaustion is completed, the discharge gas, is introduced up to a predetermined pressure. Then, finally, a basal portion of the glass tube 18 is heat-sealed.

In the thus manufactured PDP, discharge is performed: for a predetermined time to stabilize light-emitting properties and discharge properties as required.

In the process of manufacturing the PDP, the heat treatment in the sealing step using the sealing member 16 needs to be conducted at low temperature so as not to cause any trouble to the other members. That is, since the PDP contains glass materials in the glass substrates, electrodes, dielectric layers and barrier ribs, it is necessary to prevent these glass materials from being softened or deformed by heating in the sealing step. Further, it is also necessary to prevent deterioration of the dielectric layer protecting layer 7 and the fluorescent layers 13(R), 13(G) and 13(B). In general, it is desirable to carry out the sealing step at a treatment temperature of 500° C. or lower.

Thus, in the step of sealing the magnetic head or the PDP, it is preferable to use the sealing member at low temperature. Therefore, low softening point glass is used for the glass composition.

For example, examples of the low softening point glass used for the sealing member for the magnetic head include lead glasses such as $SiO_2$—$B_2O_3$—$PbO$ glass (Japanese Laid-Open Patent Publication No. HEI 8-180310) and $B_2O_3$—$PbO$—$ZnO$ glass. Further, as the sealing glass for the PDP, lead glass containing PbO as a main component is used. That is, it is essential to contain lead to achieve the low softening point.

Although lead is heavily used as a component of the low softening point glass, it has been pointed out that lead has toxicity to human beings and hazardous properties to environment. Further, working environment in the manufacture of the magnetic head or the PDP and influence on the environment that accompanies disposal of the products have been brought into question. Therefore, there has been a demand for a sealing member using a lead free glass composition.

As the lead free low-melting glass, phosphate glass has been developed. However, in actual use, it is not sufficiently reliable, particularly with respect to water resistance. Moreover, a sealing member comprising a glass composition having low water resistance, for example, is apt to absorb moisture in the atmosphere in the manufacturing process of the PDP and the moisture may possibly remain in the PDP to cause harmful effect on display performance. In order to prevent this, the glass composition contained in the sealing member is required to be excellent in water resistance.

Further, there has also been studied a glass composition comprising lead free, low-melting point bismuth glass (Japanese Laid-Open Patent Publication No. HEI 10-139478).

DISCLOSURE OF INVENTION

In view of the above, the present invention provides a lead free, highly reliable bismuth glass composition having a low working temperature, an appropriate thermal expansion coefficient and mechanical strength, as well as excellent water resistance. Further, an object of the present invention is to provide a magnetic head and a PDP using a sealing member comprising the bismuth glass composition that reduces load to the environment.

More specifically, the present invention provides a bismuth glass composition comprising 0.5 to 14 wt % of $SiO_2$, 3 to 15 wt % of $B_2O_3$, 4 to 22 wt % of ZnO, 55 to 90 wt % of $Bi_2O_3$ and 4 wt % or less of $Al_2O_3$, and further comprising 5 wt % or less of an oxide of Group A, 12 wt % or less of an oxide of Group B and 0.1 to 10 wt % of an oxide of Group C, wherein the oxide of Group A is at least one selected from the group consisting of $Li_2O$, $Na_2O$ and $K_2O$, the oxide of Group B is at least one selected from the group consisting of MgO, CaO, SrO and BaO, and the oxide of Group C is at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

The glass composition preferably comprises 0.5 to 12 wt % of $SiO_2$, 3 to 9 wt % of $B_2O_3$, 4 to 19 wt % of ZnO, 55 to 85 wt % of $Bi_2O_3$ and 0.1 to 4 wt % of $Al_2O_3$.

In the glass composition, the content of the oxide of Group A is preferably 4 wt % or less. Further, the oxide of Group A preferably comprises 2 wt % or less of $Li_2O$, 3 wt % or less of $Na_2O$ and 4 wt % or less of $K_2O$.

In the glass composition, the content of the oxide of Group B is preferably 10 wt % or less. Further, the oxide of Group B preferably comprises 5 wt % or less of MgO, 6 wt % or less of CaO, 8 wt % or less of SrO and 10 wt % or less of BaO.

In the glass composition, the content of the oxide of Group C is preferably 0.1 to 5 wt %.

The weight ratio of ZnO to $B_2O_3$ is preferably 0.8 to 2.8. In particular, if the glass composition is used as the sealing member for the PDP, the weight ratio is preferably 1.1 to 2.5.

The weight ratio of $Al_2O_3$ to $SiO_2$ is preferably 0.5 or less.

If such a glass composition is used as the sealing member for the magnetic head, the glass composition preferably comprises 1.7 to 12 wt % of $SiO_2$, 3 to 9 wt % of $B_2O_3$, 9.5 to 19 wt % of ZnO, 62 to 80 wt % of $Bi_2O_3$ and 0.1 to 4 wt % of $Al_2O_3$.

Further, the present invention relates to a magnetic head comprising a pair of magnetic core halves, at least one of which being provided with a coil groove, a magnetic gap member interposed between surfaces of the magnetic core halves facing to a magnetic gap, and the sealing member for the magnetic head for bonding the pair of magnetic core halves. A magnetic metal film may be formed on at least one of the surfaces facing to the magnetic gap. Alternatively, each of the pair of magnetic core halves comprises a pair of nonmagnetic substrates and a magnetic metal film sandwiched between the nonmagnetic substrates.

Still further, the present invention relates to a magnetic recording/reproducing device comprising the magnetic head to perform recording and reproducing information to and from a magnetic information recording medium.

If the above-described glass composition is used as the sealing member for the PDP, the glass composition preferably comprises 1.1 to 4.5 wt % of $SiO_2$, 4 to 9 wt % of $B_2O_3$, 9.5 to 18 wt % of ZnO and 72 to 85 wt % of $Bi_2O_3$. Further, the glass composition used as the sealing member for the PDP preferably comprises 0.1 to 2 wt % of $Al_2O_3$. Still further, the glass composition used as the sealing member for the PDP preferably comprises 8 wt % or less of the oxide of Group B. In particular, the oxide of Group B preferably comprises 2 wt % or less of MgO, 0.1 to 4.5 wt % of CaO, 0.1 to 4.5 wt % of SrO and 4 wt % or less of BaO.

Preferably, the sealing member for the PDP further comprises a low-expansion ceramic filler in a weight ratio of 0.01 to 4 with respect to the bismuth glass composition. As the low-expansion ceramic filler, it is preferable to use at least one selected from the group consisting of cordierite, willemite, forsterite, anorthite, zircon, mullite, β-eucryptite, β-spodumene, cristobalite, barium titanate, titanium oxide, tin oxide, aluminum oxide, zirconium oxide and quartz glass.

Moreover, the present invention relates to a PDP comprising a front plate and a rear plate facing to each other, display electrodes and address electrodes arranged between the front plate and the rear plate, barrier ribs for isolating the address electrodes, dielectric layers covering the surfaces of the display electrodes and the address electrodes, respectively, and said sealing member for the PDP for bonding the peripheries of the front plate and the rear plate. The present invention also relates to a PDP provided with an air hole formed in the front plate or the rear plate, further comprising a glass tube communicating with the air hole, wherein an opening end of the air hole and an end of the glass tube are bonded with the sealing member for the PDP.

In the present invention, the content of each element in the glass composition is expressed by the ratio of a certain oxide. However, it is not necessary that the elements exist in the form of oxide. The content of the oxide shown in the present invention is based on the assumption that every element contained in the glass composition forms the oxide as indicated.

BRIEF DESCRIPTION OF THE DRAWINGS

FIG. 5 is a schematic oblique view illustrating an example of an MIG head according to an embodiment of the present invention.

BEST MODE FOR CARRYING OUT THE INVENTION

Figure 1:
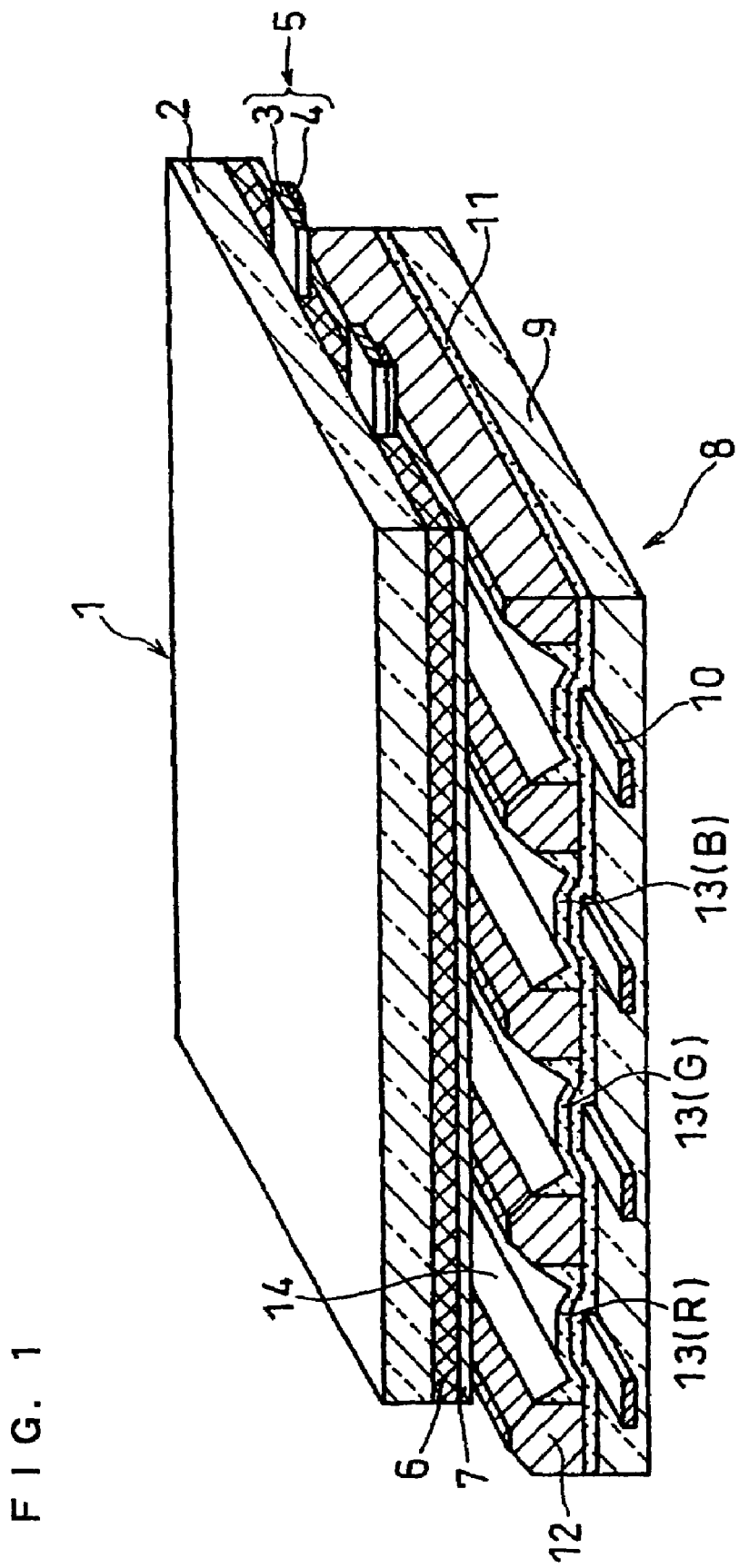
FIG. 1 is an example of a partial oblique sectional view illustrating a major structure of a common PDP.

The bismuth glass composition of the present invention comprises 0.5 to 14 wt % of $SiO_2$, 3 to 15 wt % of $B_2O_3$, 4 to 22 wt % of ZnO, 55 to 90 wt % of $Bi_2O_3$ and 4 wt % or less of $Al_2O_3$. The $Al_2O_3$ content may be 0%.

If the content of $SiO_2$ in the glass composition is less than 0.5 wt %, the glass composition cannot be obtained with stability. If the content exceeds 14 wt %, the working temperature becomes high. The $SiO_2$ content is preferably 0.5 to 12 wt %. Further, if the content of $B_2O_3$ is less than 3 wt %, the thermal expansion coefficient becomes high. If the content exceeds 15 wt %, the glass composition cannot be obtained with stability. The $B_2O_3$ content is preferably 3 to 9 wt %. Further, if the content of ZnO is less than 4 wt %, water resistance is lowered. If the content exceeds 22 wt %, the glass composition cannot be obtained with stability. The ZnO content is preferably 4 to 19 wt %. Further, if the content of $Bi_2O_3$ is less than 55 wt %, the working temperature becomes high. If the content exceeds 90 wt %, the glass composition cannot be obtained with stability. The $Bi_2O_3$ content is preferably 55 to 85 wt %. Moreover, if the content of $Al_2O_3$ exceeds 4 wt %, the working temperature becomes high. The $Al_2O_3$ content is preferably 0.1 to 4 wt %.

The glass composition further comprises 5 wt % or less of an oxide of Group A, 12 wt % or less of an oxide of Group B and 0.1 to 10 wt % of an oxide of Group C. The content of the oxide of Group A may be 0%. Further, the content of the oxide of group B may be 0%. The oxide of Group A is at least one selected from the group consisting of $Li_2O$, $Na_2O$ and $K_2O$. The oxide of Group B is at least one selected from the group consisting of MgO, CaO, SrO and BaO. Further, the oxide of Group C is at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

Among the oxides of Group C, in particular, $Nd_2O_3$, $Gd_2O_3$ and $Er_2O_3$ are preferably used. The content of the oxide of Group C is preferably 0.1 to 5 wt %.

Since the glass composition does not contain lead, pollution by lead in the working environment decreases and the lead content in waste generated in the manufacture process is reduced.

$Al_2O_3$ functions to improve the water resistance and stabilizes the glass composition in the manufacture thereof, thereby controlling crystal precipitation in the glass in heat treatment after the manufacture of the glass composition. The oxide of Group A lowers the softening point of the glass composition, thereby decreasing the working temperature of the glass composition. The oxide of Group B stabilizes the glass composition. The oxide of Group C improves mechanical strength of the glass composition.

In the glass composition according to the present invention, the content of the oxide of Group A is preferably 4 wt % or less. In particular, it is preferred that the oxide of Group A comprises 2 wt % or less of $Li_2O$, 3 wt % or less of $Na_2O$ and 4 wt % or less of $K_2O$. In this case, the content of at least one or two selected from the group consisting of $Li_2O$, $Na_2O$ and $K_2O$ may be 0%. Among them, if there is a particular demand for maintaining the glass composition with stability, $Na_2O$ is preferably used. If the $Li_2O$ content exceeds 2 wt %, the $Na_2O$ content exceeds 3 wt % or the $K_2O$ content exceeds 4 wt %, the glass composition tends to fail to maintain its hermeticity.

In the glass composition according to the present invention, the content of the oxide of Group B is preferably 10 wt % or less. In particular, the oxide of Group B preferably comprises 5 wt % or less of MgO, 6 wt % or less of CaO, 8 wt % or less of SrO and 10 wt % or less of BaO. In this case, the content of at least one, two or three selected from the group consisting of MgO, CaO, SrO and BaO may be 0%. Among them, if there is a particular demand for stabilizing the glass composition, CaO or SrO is preferably used. If the MgO content exceeds 5 wt %, the CaO content exceeds 6 wt %, the SrO content exceeds 8 wt % or the BaO content exceeds 10 wt %, the glass composition tends to fail to maintain its hermeticity.

A glass composition comprising 1.7 to 12 wt % of $SiO_2$, 3 to 9 wt % of $B_2O_3$, 9.5 to 19 wt % of ZnO, 62 to 80 wt % of $Bi_2O_3$ and 0.1 to 4 wt % of $Al_2O_3$, which is an embodiment of the above-described glass composition, is suitable for a sealing member for a magnetic head.

Further, as another embodiment of the glass composition, a glass composition comprising 1.1 to 4.5 wt % of $SiO_2$, 4 to 9 wt % of $B_2O_3$, 9.5 to 18 wt % of ZnO and 72 to 85 wt % of $Bi_2O_3$ is suitable for a sealing member for a PDP. The glass composition used as the sealing member of the PDP preferably comprises 0.1 to 2 wt % of $Al_2O_3$. Further, the content of the oxide of Group B is preferably 8 wt % or less. In particular, the oxide of Group B preferably comprises 2 wt % or less of MgO, 0.1 to 4.5 wt % of CaO, 0.1 to 4.5 wt % of SrO and 4 wt % or less of BaO. In this case, the content of one or two selected from the group consisting of MgO and BaO may be 0%. If the MgO content exceeds 2 wt %, the glass composition tends to fail to maintain its hermeticity. If the CaO content exceeds 4.5 wt % and the SrO content exceeds 4.5 wt %, the water resistance is apt to decrease. Further, if the BaO content exceeds 4 wt %, the glass composition tends to fail to maintain its hermeticity.

In the glass composition according to the present invention, the weight ratio of ZnO to $B_2O_3$ is preferably 0.8 to 2.8. In particular, if it is used as the sealing member for the PDP, the weight ratio is preferably 1.1 to 2.5. If the weight ratio of ZnO to $B_2O_3$ decreases, the hermeticity of the glass composition cannot be maintained. Further, if the weight ratio increases, the glass composition tends to fail to maintain the hermeticity.

In the glass composition according to the present invention, the weight ratio of $Al_2O_3$ to $SiO_2$ is preferably 0.5 or less. If the weight ratio of $Al_2O_3$ to $SiO_2$ increases, the glass composition tends to fail to maintain its hermeticity.

Meeting these conditions allows stabilization of the glass composition in the manufacture thereof. Further, even when the glass composition is subjected to heat treatment after the manufacture thereof, crystal precipitation in the glass is controlled.

The glass composition according to the present invention may be used for bonding, sealing or covering ceramics, glass and metal. Further, it may also be used as a paste material having various functions. For example, the glass composition of the present invention may be used in place of glass materials that have conventionally been used in every application, such as various parts of electronic equipment. More specifically, it may be used for various LCR parts, semiconductor packages, other electronic parts, and display devices such as CRTs, liquid crystal display panels and plasma display panels. Further, it may also be used for tube products for lighting, enameled products and pottery products.

Hereinafter, with reference to the drawings, an explanation is given of a magnetic head, a magnetic recording/reproducing device and a PDP using the sealing member comprising the bismuth glass composition of the present invention.

(1) Magnetic Head

Figure 4:
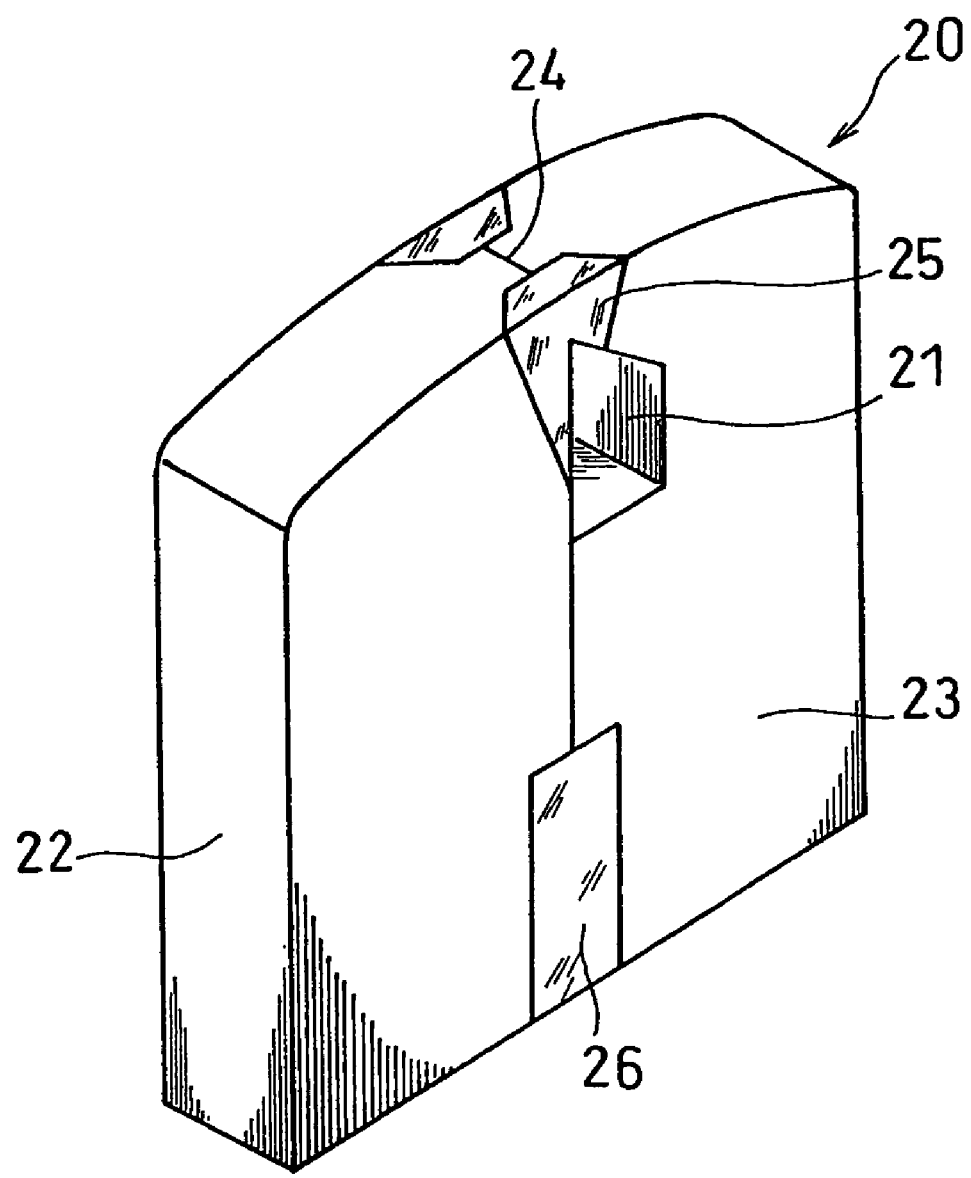
FIG. 4 is a schematic oblique view illustrating an example of a ferrite head according to an embodiment of the present invention.

FIG. 4 shows a schematic oblique view illustrating an example of a ferrite head according to an embodiment of the present invention. A ferrite head 20 comprises a pair of magnetic core halves 22 and 23 made of ferrite, at least one of which being provided with a coil groove 21, sealing members 25 and 26 for bonding the magnetic core halves 22 and 23, and a magnetic gap member 24 interposed between the surfaces of the magnetic core halves 22 and 23 facing to a magnetic gap. The surfaces of the paired magnetic core halves 22 and 23 facing to the magnetic gap are abutted to each other via the magnetic gap member 24 and the magnetic gap is formed on the interface between the abutted surfaces. The sealing members 25 and 26 bond and unite the magnetic core halves 22 and 23.

As a magnetic head according to another embodiment of the present invention, FIG. 5 shows a schematic oblique view of an example of an MIG head. An MIG head 30 comprises a pair of magnetic core halves 32 and 33 made of ferrite, at least one of which being provided with a coil groove 31, magnetic metal films 37 and 38 formed on the surfaces of the magnetic core halves 32 and 33 facing to a magnetic gap, sealing members 35 and 36 for bonding the magnetic core halves 32 and 33 and a magnetic gap member 34 interposed between the magnetic metal films 37 and 38. The surfaces of the pair of magnetic core halves 32 and 33 facing to the magnetic gap are abutted to each other via the magnetic gap member 34 and the magnetic gap is formed on the interface between the abutted surfaces. The sealing members 35 and 36 bond and unite the magnetic core halves 32 and 33.

Figure 6:
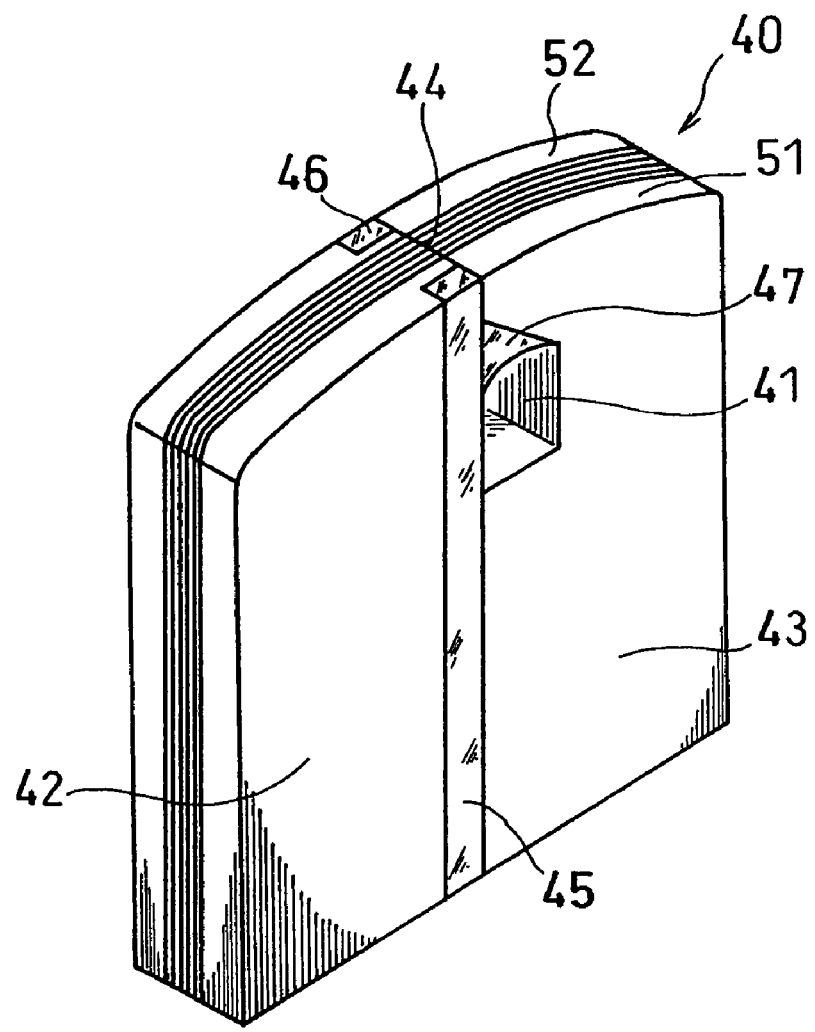
FIG. 6 is a schematic oblique view illustrating an example of a stacked head according to an embodiment of the present invention.
Figure 7:
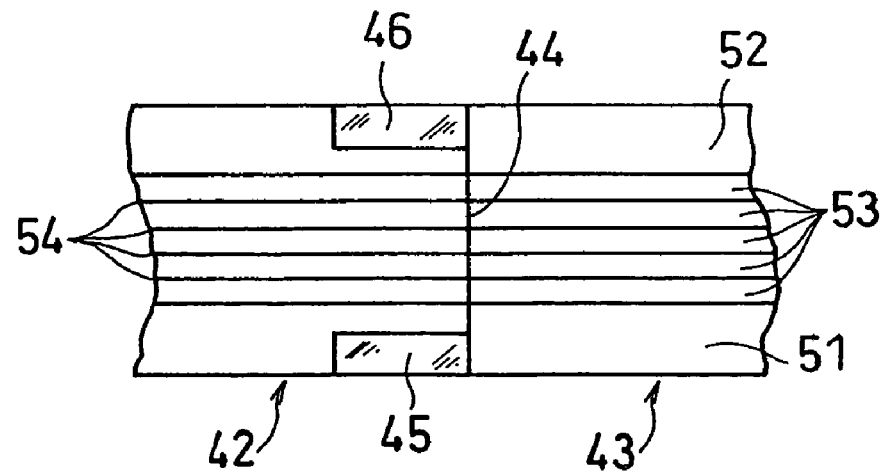
FIG. 7 is a view illustrating an example of a surface of the stacked head of FIG. 6 that slides on a magnetic recording medium.

As a magnetic head according to still another embodiment of the present invention, FIG. 6 shows a schematic oblique view illustrating an example of a stacked head. A stacked head 40 comprises a pair of multilayer magnetic core halves 42 and 43, at least one of which being provided with a coil groove 41, sealing members 45 to 47 for bonding the multilayer magnetic core halves 42 and 43 and a magnetic gap member 44 interposed between the surfaces of the multiplayer magnetic core halves 42 and 43 facing to a magnetic gap. FIG. 7 shows a surface of the stacked head 40 that slides on a magnetic recording medium. The multilayer magnetic core halves 42 and 43 comprises magnetic metal films 53 and insulating films 54 stacked alternately in a thickness direction thereof and a pair of nonmagnetic substrates 51 and 52 sandwiching the films.

The sealing members used in the above-described magnetic heads are made of a bismuth glass composition, which is molded into a circular rod or a square rod for use. In the step of sealing the magnetic head, first, a coil groove or a hollow groove for embedding the sealing member therein is formed in the pair of magnetic core halves, and then a film of the magnetic gap member is formed on the surfaces facing to the magnetic gap. Then, they are abutted to each other and the sealing member is arranged in the hollow groove. Subsequently, the sealing member is softened and liquidized by an appropriate heat treatment and then cooled and solidified to bond the pair of core halves. The thus obtained magnetic core block is cut into a predetermined size and polished to form a magnetic head chip, to which a base is bonded and a coil is provided, thereby completing the magnetic head.

It is necessary to control the temperature of the heat treatment in the sealing step not to exceed the resistible temperature of the material used for each magnetic head. The heat treatment is preferably performed at 600 to 700° C. to form the ferrite head, 500 to 600° C. to form the MIG head and 450 to 500° C. to form the stacked head.

Regarding the above-described sealing step, a glass composition which can be used at a temperature as low as possible has been demanded so as not to deteriorate the magnetic substance composing the magnetic head by heat. For this reason, the sealing member used in a common magnetic head preferably has a working temperature of 450 to 650° C. and a thermal expansion coefficient of $70 \times 10^{-7}$ to $130 \times 10^{31 \ 7}$/° C.

As to the magnetic cores, magnetic metal films, magnetic gap members, insulating films and nonmagnetic substrates of the above-described ferrite head 20, MIG head 30 and stacked head 40, conventionally used materials may be used without any limitation.

The sealing member for the magnetic head according to the present invention may also be used for magnetic heads having other structures than those of the above-described magnetic heads.

(2) Magnetic Recording/Reproducing Device

Figure 8:
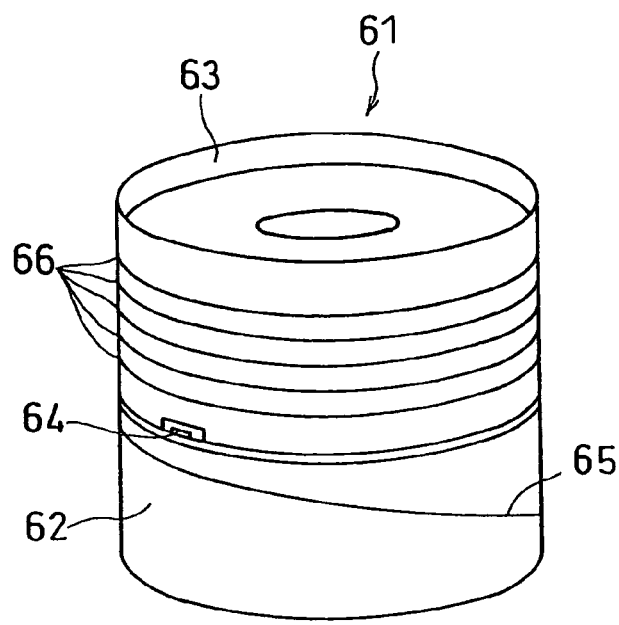
FIG. 8 is an oblique view illustrating an example of a rotating drum of a magnetic recording/reproducing device according to an embodiment of the present invention.
Figure 9:
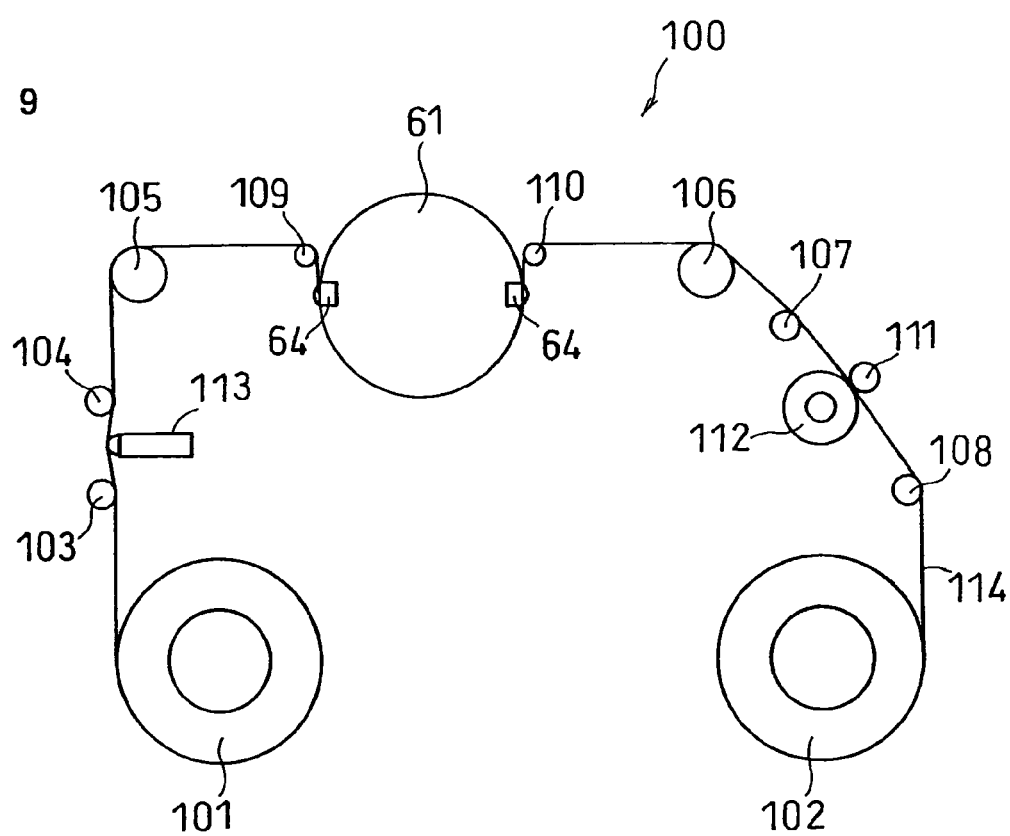
FIG. 9 is a schematic view illustrating an example of an inner mechanism of the magnetic recording/reproducing device having the rotating drum of FIG. 8.

Next, an explanation is given of an embodiment of a magnetic recording/reproducing device according to the present invention. FIG. 8 is an oblique view illustrating an example of a rotating drum of a magnetic recording/reproducing device. FIG. 9 is a schematic view illustrating an inner mechanism of an example of a magnetic recording/reproducing device having the rotating drum of FIG. 8.

A rotating drum 61 shown in FIG. 8 comprises a lower drum 62, an upper rotating drum 63, and a magnetic head 64 provided on the periphery thereof. A magnetic tape, which is not shown, travels along a lead 65 with inclination relative to the rotation axis of the upper rotating drum 63. The magnetic head 64 slides with inclination relative to the traveling direction of the magnetic tape. Further, a plurality of grooves 66 are formed on the periphery surface of the upper rotating drum 63 such that the upper rotating drum 63 and the magnetic tape can slide in close contact with stability. The grooves 66 emit air caught up between the magnetic tape and the upper rotating drum 63.

As shown in FIG. 9, a magnetic recording/reproducing device 100 comprises a rotating drum 61, a supply reel 101, a take-up reel 102, rotating posts 103, 104, 105, 106, 107 and 108, inclined posts 109 and 110, a capstan 111, a pinch roller 112 and a tension arm 113. The magnetic heads 64 for recording/reproducing are arranged on the periphery surface of the rotating drum 61.

A magnetic tape 114 wound on the supply reel 101 travels between the pinch roller 112 and the capstan 111 to be wound on the take-up reel 102. The rotating drum 61 is of an upper rotating drum type, in which two magnetic heads 64 are arranged such that they are protruded by about 20 μm from the periphery surface of the rotating drum.

According to the present embodiment, the rotating drum of the upper rotating drum type is exemplified. However, the present invention is also applicable to a magnetic recording/reproducing device of a center drum rotating type adopting three drums of an upper drum, a center drum and a lower drum. Further, not only the magnetic head for recording/reproducing, the present invention is also applicable to a magnetic head for recording and a magnetic head for reproducing. In the recording/reproducing device, the number of the magnetic head is not limited. Further, the explanation herein is directed to the case where the magnetic tape is a recording medium. However, the present invention is also applicable to a magnetic head which performs recording/reproducing information to and from a disc-shaped recording medium, as well as a magnetic recording/reproducing device comprising the same.

(3) PDP

Hereinafter, an explanation is given of a PDP using the bismuth glass composition of the present invention as the sealing member with reference to the drawings. The PDP described herein is the same in structure as that shown in FIGS. 1 to 3 described in Background Art except that the composition of the glass composition in the sealing member is varied.

First, an example of a method for forming a front plate 1 of the PDP is explained with reference to FIG. 1.

First, onto a front glass substrate 2 made of high distortion point glass, a paste for forming transparent conductive films is applied by screen printing. Then, a paste for forming bus electrodes as a supplement to the conductivity is applied thereto by screen printing. These pastes are baked to form display electrodes 5. The transparent conductive film 3 is made of ITO (indium tin oxide), for example, and the bus electrodes 4 are made of, for example, an Ag film or a three-layered film of Cr/Cu/Cr. Alternative to the screen printing, the transparent conductive films 3 and the bus electrodes 4 may be formed by photo-etching.

A paste containing dielectric glass is applied to the top of the display electrodes 5 by screen printing and baked to form a dielectric layer 6. The dielectric layer 6 may be formed by disposing a sheet containing dielectric glass and a resin on the display electrodes 5, followed by baking. The sheet as described above may be obtained by mixing the dielectric glass and the resin with a solvent, forming a coating film of the mixture and volatilizing the solvent from the film.

On the surface of the dielectric layer 6, a dielectric layer protecting layer 7 made of magnesium oxide, for example, is formed by vapor deposition or CVD. In this manner, the front plate 1 is formed.

Next, a method for forming a rear plate 8 of the PDP is explained with reference to FIG. 1.

First, on a rear glass substrate 9 made of high distortion point glass, a paste for forming electrodes (e.g., Ag or Cr/Cu/Cr) is applied in a stripe pattern at regular intervals by screen printing or the like and baked to form address electrodes 10.

Then, a dielectric layer 11 is formed to cover the top of the address electrodes 10. The dielectric layer 11 is formed by applying a paste containing dielectric glass to the address electrodes 10 by screen printing, followed by baking.

On the address electrodes 10, barrier ribs 12 serving as partitions among discharge spaces 14 are provided in a stripe pattern. The barrier ribs 12 are formed by, for example, applying a paste containing a glass material repeatedly by screen printing, followed by baking. Alternatively, the address electrodes 10, the dielectric layer 11 and the barrier ribs 12 may be formed by photo-etching or the like.

Inside the thus formed discharge spaces 14, pastes each containing fluorescent materials of red (R), green (G) and blue (B) are applied sequentially by screen printing. By baking them, a red fluorescent layer 13(R), a green fluorescent layer 13(G) and a blue fluorescent layer 13(B) are formed. As examples of the fluorescent materials used, $Y_2O_3$:Eu is used for the red fluorescent layer 13(R), $Zn_2SiO_4$:Mn is used for the green fluorescent layer 13(G) and $BaMgAl_{10}O_{17}$:Eu is used for the blue fluorescent layer 13(B).

Figure 2:
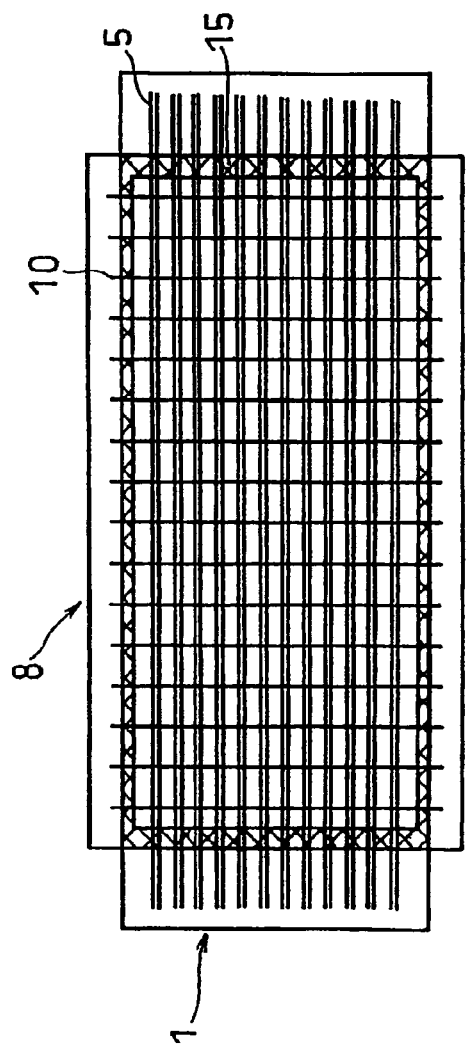
FIG. 2 is a view illustrating the arrangement of display electrodes and address electrodes of the PDP and a sealing part.
Figure 3:
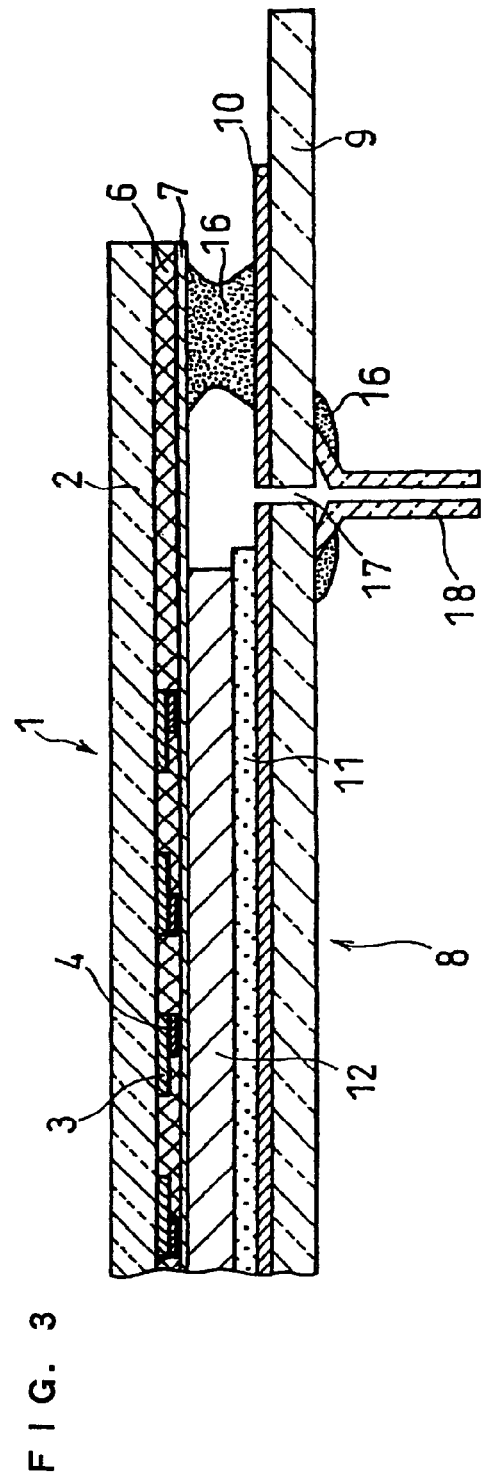
FIG. 3 is an example of a section cut along the address electrode of the PDP shown in FIG. 1 illustrating the vicinity of the sealing part.

With reference to FIGS. 2 and 3, an explanation is given of bonding of the thus formed front plate 1 and rear plate 8 using a sealing member.

A sealing member 16 comprises bismuth glass composition powder, which is kneaded with a resin and a solvent to prepare a paste. Examples of the resin include ethyl cellulose, nitrocellulose, acrylic resin and the like. Examples of the solvent include terpineol, isoamyl acetate and the like. The amounts of the resin and the solvent contained in the paste are preferably 0.01 to 30 parts by weight and 3 to 120 parts by weight, respectively, relative to 100 parts by weight of the glass composition.

The paste is applied to a sealing part 15 of the rear plate 8 shown in FIG. 2 by screen printing or injection. Then, the whole is provisionally baked at a temperature that allows removal of the resin component contained in the paste (350° C. for example). Then, the front plate 1 and the rear plate 8 are stacked such that the display electrodes 5 and the address electrodes 10 are orthogonal to each other. Then, the sealing member 16 is further baked. In this manner, bonding of the front plate 1 and the rear plate 8 is achieved.

The sealing member 16 is applied to at least either one of the front plate 1 and the rear plate 8 and the sealing method is not limited to the above.

Next, with reference to FIG. 3, filling of gas into the discharge spaces 14 is explained.

First, an opening end of an air hole 17 formed in the front plate 1 or the rear plate 8 is bonded with an end of a glass tube 18 communicating with the air hole 17. For example, a paste comprising the sealing member is applied to the opening end of the air hole 17 and the end of the glass tube 18 by injection, followed by baking, to achieve the bonding.

Subsequently, in order to vacuum the discharge spaces 14, air is exhausted through the glass tube 18 while heating the whole of the bonded front plate 1 and rear plate 8, thereby purging gas existing between the front plate and the rear plate. Then, discharge gas is filled therein through the glass tube 18 such that the pressure in the discharge spaces 14 reaches a predetermined level. Then, the glass tube 18 is heated and fused to cut it at a basal portion thereof, thereby sealing the air hole 17. Finally, the display electrodes 5 and the address electrodes 10 are connected to external driving circuits (not shown) to complete the PDP.

The bonding of the air hole 17 and the glass tube 18 may be performed at the same time as the bonding of the front plate 1 and the rear plate 8.

In the above-described sealing step, it is necessary not to cause harmful effects on the components of the PDP by heat such as deterioration and degradation. For that purpose, in a common PDP, the sealing is preferably conducted at a temperature not higher than 500° C.

The sealing with the sealing member 16 is not limited to the above-described method of using the paste prepared by kneading the bismuth glass composition powder, the resin and the solvent. For example, the sealing member 16 may be formed into a predetermined shape such as a rod or a frame, which is disposed on the sealing part, followed by heating and softening, to perform the same sealing step as described above.

In the present embodiment, the explanation is given by way of a structure of a PDP of alternating current system. However, the discharge system of the PDP to which the present invention is applicable is not limited thereto. The present invention can be applied to both of the alternate current system and the direct current system.

Hereinafter, the present invention is explained in further detail by way of examples, but the present invention is not limited to these examples.

EXAMPLE 1

Bismuth glass compositions having the compositions shown in Tables 1 to 20 were formed.

After the predetermined materials were prepared and mixed, the obtained mixture was placed in a platinum crucible and melted in an electric furnace at 900 to 1300° C. for 1 hour. Then, the obtained molten glass was quenched with a roller to form a flaky glass composition. Tables 1 to 20 show the composition, glass stability, working temperature, thermal expansion coefficient, strength and water resistance of the obtained glass compositions.

The glass stability, working temperature, thermal expansion coefficient, strength and water resistance were evaluated in the following manner.

[Stability]

The glass stability was judged from whether or not precipitation of crystals (hereinafter may be referred to as devitrification) was caused from the glassy state in heat treatment performed at each working temperature for 30 minutes. The stability was indicated by ○ when the glass composition was not devitrified in the manufacture thereof and did not cause the crystal precipitation in the heat treatment at the above-described test temperature, Δ when the glass composition was not devitrified in the manufacture thereof but caused the crystal precipitation in the heat treatment at the above-described test temperature, or X when the glass composition was devitrified in the manufacture thereof and the glass composition was not obtained. If the glass composition is used as a sealing member for a magnetic head, the glass composition is preferably amorphous in view of flowability. However, as long as there are no problems such as generation of cracks or decrease in strength, crystals may be precipitated in the sealing member after the sealing.

[Working Temperature]

The working temperature of the glass composition was determined as a temperature at which the viscosity of the molten glass composition becomes $10^3$ Pa·s. If the glass composition is used as the sealing member for the magnetic head, the working temperature is preferably 450 to 650° C. Preferably, the sealing member is softened and liquidized at a temperature around the working temperature to seal the magnetic head. However, the sealing member may be used with a viscosity suitable for the manufacture method of the magnetic head.

[(Thermal Expansion Coefficient]

The glass composition was re-fused, poured into a mold and cooled to form a glass rod of 4 mm in diameter and 20 mm in length. Under heating at 10° C./min, linear expansivity of the glass rod was measured. Then, an average thermal expansion coefficient at 30 to 300° C. was calculated. If the glass composition is used as the sealing member for the magnetic head, the average thermal expansion coefficient is preferably $70 \times 10^{-7}$ to $130 \times 10^{-7}$/° C.

[Mechanical Strength]

The mechanical strength was measured by a three-point bending method. The glass composition was re-fused to be a melt having a suitable viscosity, from which a glass rod of 1 mm in diameter and 30 mm in length was drawn. The glass rod was held horizontally by two points at an interval of 20 mm at the center portion thereof, and a load was applied to the center between the two points from above by a load cell at a rate of 1 mm/min. Based on the load that broke the glass rod, the mechanical strength was calculated.

[Water Resistance]

To evaluate the water resistance, a cube of 10 mm on a side was manufactured as a sample by re-fusing the glass composition, which was immersed into boiling ion-exchanged water for an hour. A value of decrease in weight per unit surface area of the glass composition was indicated as the water resistance by the unit of (mg/cm$^2$). If the glass composition is used as the sealing member for the magnetic head, this value is preferably 1.0 mg/cm$^2$ or less.

Table 1 shows the glass compositions manufactured to make a study of the content of $SiO_2$. The glass compositions of Nos. 2 to 6 are Examples and those of Nos. 1 and 7 are Comparative Examples.

Further, when the $SiO_2$ content is 0.5 wt %, the water resistance is close to 1 mg/cm$^2$. When the $SiO_2$ content is 14 wt %, crystal precipitation is apt to occur in the glass in the heat treatment of the glass composition after the manufacture thereof, which may cause a problem in maintaining hermeticity. Therefore, if the glass composition is used particularly

TABLE 1

| No. | | Comparative Example 1 | Example 2 | Example 3 | Example 4 | Example 5 | Example 6 | Comparative Example 7 |
|---|---|---|---|---|---|---|---|---|
| Composition (wt %) | $SiO_2$ | 0.3 | 0.5 | 1.7 | 3.2 | 12.0 | 14.0 | 15.0 |
| | $B_2O_3$ | 5.1 | 5.1 | 6.8 | 6.6 | 8.5 | 6.5 | 5.5 |
| | ZnO | 5.5 | 5.5 | 9.9 | 12.4 | 14.5 | 14.5 | 14.5 |
| | $Bi_2O_3$ | 87.6 | 87.6 | 80.0 | 75.6 | 63.2 | 63.2 | 63.2 |
| | $Al_2O_3$ | 0.1 | — | 0.4 | 1.0 | 0.1 | 0.1 | 0.1 |
| | $Na_2O$ | 1.2 | 1.2 | 0.9 | 0.6 | 0.7 | 0.7 | 0.7 |
| | $La_2O_3$ | 0.2 | 0.1 | — | 0.6 | — | — | — |
| | $CeO_2$ | — | — | — | — | 1.0 | 1.0 | 1.0 |
| | $Er_2O_3$ | — | — | 0.3 | — | — | — | — |
| Stability | | X | ○ | ○ | ○ | ○ | Δ | Δ |
| Working temperature (° C.) | | — | 455 | 500 | 535 | 630 | 650 | 660 |
| Thermal expansion coefficient (×10$^{-7}$/° C.) | | — | 130 | 110 | 98 | 78 | 81 | 80 |
| Mechanical Strength (MPa) | | — | 116 | 121 | 128 | 139 | 144 | 151 |
| Water resistance (mg/cm$^2$) | | — | 0.8 | 0.6 | 0.5 | 0.3 | 0.0 | 0.0 |

As clearly shown in Table 1, when the $SiO_2$ content was 0.3 wt %, the glass composition was devitrified in the manufacture thereof, thereby the glass composition was not obtained with stability. When the $SiO_2$ content was 15 wt %, the working temperature exceeded 650° C. From the above results, the $SiO_2$ content is preferably 0.5 to 14 wt %.

as the sealing member for the magnetic head, the $SiO_2$ content is preferably 1.7 to 12 wt %.

Table 2 shows the glass compositions manufactured to make a study of the content of $B_2O_3$. The glass compositions of Nos. 9 to 12 are Examples and those of Nos. 8 and 13 are Comparative Examples.

TABLE 2

| No. | | Comparative Example 8 | Example 9 | Example 10 | Example 11 | Example 12 | Comparative Example 13 |
|---|---|---|---|---|---|---|---|
| Composition (wt %) | $SiO_2$ | 2.5 | 2.0 | 4.3 | 10.0 | 5.8 | 5.8 |
| | $B_2O_3$ | 2.5 | 3.0 | 7.5 | 9.0 | 15.0 | 16.4 |
| | ZnO | 7.0 | 8.0 | 12.8 | 20.3 | 13.4 | 13.4 |
| | $Bi_2O_3$ | 82.5 | 82.5 | 72.4 | 57.9 | 63.1 | 63.1 |
| | $Al_2O_3$ | 1.0 | 1.0 | 1.0 | 1.0 | — | — |
| | $Na_2O$ | 1.0 | 1.0 | — | — | — | 1.0 |
| | $K_2O$ | — | — | — | 1.0 | — | — |
| | CaO | 1.0 | 1.0 | — | 0.5 | — | — |
| | SrO | 1.0 | 1.0 | — | — | — | — |
| | $Y_2O_3$ | — | — | — | — | 0.2 | — |
| | $La_2O_3$ | 1.0 | — | 1.0 | 0.3 | 0.5 | — |
| | $CeO_2$ | — | — | — | — | 0.5 | — |
| | $Nd_2O_3$ | — | — | — | — | 0.5 | 0.3 |
| | $Gd_2O_3$ | 0.5 | 0.5 | 1.0 | — | 0.5 | — |
| | $Er_2O_3$ | — | — | — | — | 0.5 | — |
| Stability | | ○ | ○ | ○ | ○ | Δ | X |
| Working temperature (° C.) | | 480 | 470 | 560 | 625 | 610 | — |
| Thermal expansion coefficient (×10$^{-7}$/° C.) | | 133 | 129 | 89 | 80 | 70 | — |
| Mechanical Strength (MPa) | | 124 | 120 | 127 | 131 | 122 | — |
| Water resistance (mg/cm$^2$) | | 0.5 | 0.7 | 0.5 | 0.2 | 0.0 | — |

As clearly shown in Table 2, when the $B_2O_3$ content was 2.5 wt %, the thermal expansion coefficient was $133 \times 10^{-7}/°$ C. which exceeded $130 \times 10^{-7}/°$ C. When the $B_2O_3$ content was 16.4 wt %, the glass composition was devitrified in the manufacture thereof and the glass composition was not obtained with stability. Therefore, the $B_2O_3$ content is preferably 3 to 15 wt %.

If the $B_2O_3$ content is 15.0 wt %, crystal precipitation is apt to occur in the glass in the heat treatment of the glass composition after the manufacture thereof, which may possibly cause a problem in maintaining hermeticity. Therefore, if the glass composition is used particularly as the sealing member for the magnetic head, the $B_2O_3$ content is preferably 3 to 9 wt %.

Table 3 shows the glass compositions manufactured to make a study of the content of ZnO. The glass compositions of Nos. 15 to 19 are Examples and those of Nos. 14 and 20 are Comparative Examples.

As clearly shown in Table 3, when the ZnO content was 3.2 wt %, the water resistance was 1.5 mg/cm$^2$, which exceeded 1.0 mg/cm$^2$. When the ZnO content was 23.2 wt %, the glass composition was devitrified in the manufacture thereof, therefore the glass composition was not obtained with stability. Accordingly, the ZnO content is preferably 4 to 22 wt %.

If the glass composition is used particularly as the sealing member for the magnetic head, the ZnO content is preferably 9.5 to 19 wt % so as to further improve the water resistance and prevent the crystal precipitation in the glass in the heat treatment of the glass composition after the manufacture thereof.

Table 4 shows the glass compositions manufactured to make a study of the content of $Bi_2O_3$. The glass compositions of Nos. 22 to 27 are Examples and those of Nos. 21 and 28 are Comparative Examples.

TABLE 3

| | | Comparative Example | Example | | | | | Comparative Example |
|---|---|---|---|---|---|---|---|---|
| No. | | 14 | 15 | 16 | 17 | 18 | 19 | 20 |
| Composition (wt %) | $SiO_2$ | 5.1 | 5.0 | 6.0 | 7.6 | 3.5 | 9.0 | 8.0 |
| | $B_2O_3$ | 4.0 | 5.0 | 6.3 | 7.8 | 7.0 | 8.6 | 8.5 |
| | ZnO | 3.2 | 4.0 | 9.5 | 15.8 | 19.0 | 22.0 | 23.2 |
| | $Bi_2O_3$ | 82.5 | 80.9 | 73.0 | 62.3 | 69.5 | 57.9 | 56.5 |
| | $Al_2O_3$ | 1.4 | 1.5 | 1.3 | 1.0 | 0.4 | 1.0 | 1.8 |
| | $Na_2O$ | 2.2 | 2.0 | 2.0 | 1.0 | — | 1.0 | 1.5 |
| | $K_2O$ | — | — | — | 3.0 | — | — | — |
| | MgO | — | 0.5 | — | — | — | — | — |
| | CaO | 1.2 | 0.5 | 1.2 | 0.5 | — | — | — |
| | $Sc_2O_3$ | — | — | — | — | — | 0.5 | — |
| | $La_2O_3$ | 0.4 | — | — | 0.5 | — | — | 0.5 |
| | $CeO_2$ | — | — | — | 0.5 | — | — | — |
| | $Pr_2O_3$ | — | 0.1 | — | — | — | — | — |
| | $Nd_2O_3$ | — | 0.1 | 0.7 | — | — | — | — |
| | $Sm_2O_3$ | — | 0.1 | — | — | — | — | — |
| | $Eu_2O_3$ | — | 0.1 | — | — | — | — | — |
| | $Gd_2O_3$ | — | 0.1 | — | — | — | — | — |
| | $Tb_2O_3$ | — | 0.1 | — | — | — | — | — |
| | $Dy_2O_3$ | — | — | — | — | 0.1 | — | — |
| | $Ho_2O_3$ | — | — | — | — | 0.1 | — | — |
| | $Er_2O_3$ | — | — | — | — | 0.1 | — | — |
| | $Tm_2O_3$ | — | — | — | — | 0.1 | — | — |
| | $Yb_2O_3$ | — | — | — | — | 0.1 | — | — |
| | $Lu_2O_3$ | — | — | — | — | 0.1 | — | — |
| Stability | | ◯ | ◯ | ◯ | ◯ | ◯ | Δ | X |
| Working temperature (° C.) | | 520 | 525 | 565 | 610 | 540 | 615 | — |
| Thermal expansion coefficient ($\times 10^{-7}/°$ C.) | | 118 | 116 | 109 | 101 | 82 | 80 | — |
| Mechanical strength (MPa) | | 121 | 124 | 128 | 132 | 121 | 130 | — |
| Water resistance (mg/cm$^2$) | | 1.5 | 0.5 | 0.3 | 0.2 | 0.2 | 0.1 | — |

TABLE 4

| No. | | Comparative Example 21 | Example 22 | Example 23 | Example 24 | Example 25 | Example 26 | Example 27 | Comparative Example 28 |
|---|---|---|---|---|---|---|---|---|---|
| Composition (wt %) | $SiO_2$ | 12.0 | 11.2 | 7.0 | 1.7 | 2.0 | 2.1 | 0.6 | 0.5 |
| | $B_2O_3$ | 8.6 | 8.6 | 7.9 | 7.1 | 5.0 | 3.7 | 4.1 | 3.0 |
| | ZnO | 22.0 | 20.3 | 16.7 | 12.1 | 11.5 | 7.9 | 4.5 | 4.0 |
| | $Bi_2O_3$ | 52.5 | 55.0 | 62.0 | 71.0 | 80.0 | 85.0 | 90.0 | 92.0 |
| | $Al_2O_3$ | 1.0 | 1.0 | 0.9 | 0.8 | 0.5 | 0.8 | — | 0.1 |
| | $Li_2O$ | 0.5 | 0.5 | — | — | — | 0.4 | — | — |
| | $Na_2O$ | 1.5 | 1.5 | 1.4 | 0.3 | — | — | 0.5 | 0.2 |
| | $K_2O$ | — | — | — | — | — | — | — | — |
| | MgO | — | — | — | — | — | — | — | — |
| | CaO | 1.0 | 1.0 | 0.6 | — | — | — | — | — |
| | $Sc_2O_3$ | — | — | — | 1.0 | — | — | — | — |
| | $Y_2O_3$ | — | — | — | 1.0 | — | — | — | — |
| | $La_2O_3$ | 0.9 | 0.9 | — | 1.0 | 0.5 | — | — | — |
| | $CeO_2$ | — | — | — | 1.0 | — | — | — | 0.2 |
| | $Nd_2O_3$ | — | — | — | 1.0 | — | — | — | — |
| | $Gd_2O_3$ | — | — | 3.5 | 1.0 | — | — | 0.3 | — |
| | $Er_2O_3$ | — | — | — | 1.0 | — | 0.1 | — | — |
| Stability | | ◯ | ◯ | ◯ | ◯ | ◯ | ◯ | Δ | X |
| Working temperature (° C.) | | 660 | 640 | 585 | 525 | 485 | 465 | 450 | — |
| Thermal expansion coefficient ($\times 10^{-7}$/° C.) | | 80 | 85 | 92 | 101 | 117 | 110 | 130 | — |
| Strength (MPa) | | 140 | 135 | 129 | 122 | 120 | 115 | 110 | — |
| Water resistance (mg/cm$^2$) | | 0.0 | 0.2 | 0.2 | 0.3 | 0.3 | 0.5 | 0.8 | — |

As clearly shown in Table 4, when the $Bi_2O_3$ content was 52.5 wt %, the working temperature was 660° C., which exceeded 650° C. When the $Bi_2O_3$ content was 92.0 wt %, the glass composition was devitrified in the manufacture thereof and the glass composition was not obtained with stability. Accordingly, the $Bi_2O_3$ content is preferably 55 to 90 wt %.

If the glass composition is used particularly as the sealing member of the magnetic head, the $Bi_2O_3$ content is preferably 62 to 80 wt % so as to further lower the working temperature and prevent the crystal precipitation in the glass in the heat treatment of the glass composition after the manufacture thereof.

Table 5 shows the glass compositions manufactured to make a study of the content of $Al_2O_3$. The glass compositions of Nos. 29 to 32 are Examples and the glass composition of No. 33 is Comparative Example.

TABLE 5

| No. | | Example 29 | Example 30 | Example 31 | Example 32 | Comparative Example 33 |
|---|---|---|---|---|---|---|
| Composition (wt %) | $SiO_2$ | 2.0 | 12.0 | 4.7 | 9.0 | 10.0 |
| | $B_2O_3$ | 4.5 | 7.0 | 5.5 | 9.6 | 9.0 |
| | ZnO | 11.5 | 14.5 | 12.9 | 18.3 | 18.1 |
| | $Bi_2O_3$ | 80.5 | 64.2 | 73.0 | 58.2 | 57.7 |
| | $Al_2O_3$ | — | 0.1 | 2.0 | 4.0 | 5.0 |
| | $Na_2O$ | 1.0 | 0.7 | 1.2 | 0.8 | — |
| | $Y_2O_3$ | — | — | 0.7 | — | — |
| | $La_2O_3$ | 0.5 | 0.5 | — | — | — |
| | $CeO_2$ | — | 1.0 | — | — | — |
| | $Nd_2O_3$ | — | — | — | 0.1 | — |
| | $Gd_2O_3$ | — | — | — | — | 0.2 |

TABLE 5-continued

| No. | Example 29 | Example 30 | Example 31 | Example 32 | Comparative Example 33 |
|---|---|---|---|---|---|
| Stability | Δ | ◯ | ◯ | ◯ | ◯ |
| Working temperature (° C.) | 470 | 635 | 545 | 650 | 660 |
| Thermal expansion coefficient ($\times 10^{-7}$/° C.) | 122 | 82 | 91 | 77 | 73 |
| Mechanical strength (MPa) | 121 | 138 | 130 | 137 | 139 |
| Water resistance (mg/cm$^2$) | 0.6 | 0.0 | 0.2 | 0.0 | 0.0 |

Though $Al_2O_3$ is not always an essential component, it functions to accelerate the vitrification of the glass composition and improve the water resistance. As clearly shown in Table 5, when the $Al_2O_3$ content was 5 wt %, the working temperature was 660° C., which exceeded 650° C. Therefore, the $Al_2O_3$ content is preferably 4 wt % or less.

If the glass composition does not contain $Al_2O_3$, the crystal precipitation is apt to occur in the glass in the heat treatment of the glass composition after the manufacture thereof, which may possibly cause a problem in maintaining hermeticity. Therefore, if the glass composition is used particularly as the sealing member for the magnetic head, the $Al_2O_3$ content is preferably 0.1 to 4 wt %. Moreover, in order to further lower the working temperature, it is more preferable to set the $Al_2O_3$ content to 0.1 to 2 wt %.

Tables 6 and 7 show the glass compositions manufactured to make a study of the contents of $Li_2O$, $Na_2O$ and $K_2O$. The glass compositions of Nos. 34 to 44 are Examples and those of Nos. 45 to 48 are Comparative Examples.

TABLE 6

| | | Example | | | | | | | |
|---|---|---|---|---|---|---|---|---|---|
| No. | | 34 | 35 | 36 | 37 | 38 | 39 | 40 | 41 |
| Composition (wt %) | $SiO_2$ | 1.2 | 1.2 | 1.2 | 4.0 | 4.0 | 4.0 | 1.2 | 1.2 |
| | $B_2O_3$ | 6.7 | 6.7 | 6.7 | 9.0 | 9.0 | 9.0 | 6.7 | 6.7 |
| | ZnO | 7.8 | 7.8 | 7.8 | 13.6 | 13.6 | 13.6 | 7.8 | 7.8 |
| | $Bi_2O_3$ | 80.3 | 80.3 | 79.3 | 67.4 | 67.4 | 67.4 | 80.3 | 79.3 |
| | $Al_2O_3$ | 0.5 | 0.5 | 0.5 | 1.0 | 1.0 | 1.0 | 0.5 | 0.5 |
| | $Li_2O$ | 1.0 | 1.0 | 1.0 | 2.0 | — | — | 3.0 | — |
| | $Na_2O$ | 1.0 | 2.0 | 1.0 | 1.0 | 3.0 | — | — | 4.0 |
| | $K_2O$ | 1.0 | — | 2.0 | 1.0 | 1.0 | 4.0 | — | — |
| | $La_2O_3$ | 0.5 | 0.5 | 0.5 | — | — | — | 0.5 | 0.5 |
| | $CeO_2$ | — | — | — | 1.0 | 1.0 | 1.0 | — | — |
| Stability | | ○ | ○ | ○ | ○ | ○ | ○ | Δ | Δ |
| Working temperature (° C.) | | 475 | 475 | 470 | 585 | 585 | 580 | 470 | 465 |
| Thermal expansion coefficient ($\times 10^{-7}$/° C.) | | 125 | 124 | 127 | 109 | 108 | 112 | 125 | 127 |
| Mechanical strength (MPa) | | 121 | 120 | 122 | 128 | 127 | 126 | 118 | 119 |
| Water resistance (mg/cm$^2$) | | 0.6 | 0.5 | 0.7 | 0.3 | 0.2 | 0.4 | 0.5 | 0.6 |

TABLE 7

| | | Example | | | Comparative Example | | | |
|---|---|---|---|---|---|---|---|---|
| No. | | 42 | 43 | 44 | 45 | 46 | 47 | 48 |
| Composition (wt %) | $SiO_2$ | 1.2 | 3.0 | 3.0 | 1.0 | 1.0 | 1.0 | 1.0 |
| | $B_2O_3$ | 6.7 | 9.0 | 9.0 | 6.5 | 6.5 | 6.5 | 6.5 |
| | ZnO | 7.8 | 13.6 | 13.6 | 7.5 | 7.5 | 7.5 | 7.5 |
| | $Bi_2O_3$ | 78.3 | 67.4 | 67.4 | 77.3 | 77.3 | 77.3 | 77.3 |
| | $Al_2O_3$ | 0.5 | 1.0 | 1.0 | 0.2 | 0.2 | 0.2 | 0.2 |
| | $Li_2O$ | — | 2.0 | — | 2.0 | 7.0 | — | — |
| | $Na_2O$ | — | 3.0 | 1.0 | 2.0 | — | 7.0 | — |
| | $K_2O$ | 5.0 | — | 4.0 | 3.0 | — | — | 7.0 |
| | $La_2O_3$ | 0.5 | — | — | 0.5 | 0.5 | 0.5 | 0.5 |
| | $CeO_2$ | — | 1.0 | 1.0 | — | — | — | — |
| Stability | | Δ | Δ | Δ | Δ | Δ | Δ | Δ |
| Working temperature (° C.) | | 455 | 570 | 565 | 450 | 450 | 450 | 440 |
| Thermal expansion coefficient ($\times 10^{-7}$/° C.) | | 130 | 111 | 114 | 134 | 135 | 137 | 140 |
| Mechanical strength (MPa) | | 119 | 126 | 124 | 113 | 114 | 111 | 114 |
| Water resistance (mg/cm$^2$) | | 0.7 | 0.4 | 0.6 | 1.2 | 1.5 | 1.8 | 1.9 |

Though $Li_2O$, $Na_2O$ and $K_2O$ are not always essential components, the working temperature of the glass composition is lowered if at least one or more of them is contained.

As clearly shown in Tables 6 and 7, if the total content of $Li_2O$, $Na_2O$ and $K_2O$ was 7 wt %, the thermal expansion coefficient exceeded $130 \times 10^{-7}$/° C. and a decrease in weight per unit area, which represents the water resistance, also exceeded 1.0 mg/cm$^2$. Accordingly, the total content of $Li_2O$, $Na_2O$ and $K_2O$ is preferably 5 wt % or less, more preferably 4 wt % or less.

When the $Li_2O$ content was 3 wt %, the $Na_2O$ content was 4 wt % and the $K_2O$ content was 5 wt %, the crystal precipitation was apt to occur in the glass in the heat treatment of the glass composition after the manufacture thereof. Accordingly, it is preferable to set the $Li_2O$ content to 2 wt % or less, the $Na_2O$ content to 3 wt % or less and the $K_2O$ content to 4 wt % or less.

Tables 8 and 9 show the glass compositions manufactured to make a study of the contents of MgO, CaO, SrO and BaO. The glass compositions of Nos. 49 to 62 are Examples and those of Nos. 63 to 67 are Comparative Examples.

TABLE 8

| | | Example | | | | | | | | | |
|---|---|---|---|---|---|---|---|---|---|---|---|
| No. | | 49 | 50 | 51 | 52 | 53 | 54 | 55 | 56 | 57 | 58 |
| Composition (wt %) | $SiO_2$ | 2.9 | 2.6 | 2.6 | 2.6 | 2.6 | 4.0 | 2.6 | 2.6 | 2.6 | 2.6 |
| | $B_2O_3$ | 3.7 | 6.3 | 6.3 | 6.3 | 6.3 | 5.0 | 7.3 | 7.3 | 6.3 | 6.3 |
| | ZnO | 5.7 | 8.0 | 8.0 | 8.0 | 8.0 | 8.5 | 9.0 | 9.0 | 8.0 | 8.0 |
| | $Bi_2O_3$ | 80.5 | 70.9 | 70.9 | 70.9 | 70.9 | 71.5 | 72.9 | 71.9 | 71.9 | 68.9 |
| | $Al_2O_3$ | 1.1 | 1.0 | 1.0 | 1.0 | 1.0 | 0.5 | 1.0 | 1.0 | 1.0 | 1.0 |
| | $Na_2O$ | 1.1 | 0.2 | 0.2 | 0.2 | 0.2 | — | 0.2 | 0.2 | 0.2 | 0.2 |
| | MgO | 1.0 | 5.0 | 2.0 | — | — | 1.0 | 6.0 | — | — | — |
| | CaO | 1.0 | 1.0 | 6.0 | — | — | 2.0 | — | 7.0 | — | — |
| | SrO | 1.0 | 2.0 | 2.0 | 8.0 | — | 3.0 | — | — | 9.0 | — |

TABLE 8-continued

| No. | 49 | 50 | 51 | 52 | 53 | 54 | 55 | 56 | 57 | 58 |
|---|---|---|---|---|---|---|---|---|---|---|
| BaO | 1.0 | 2.0 | — | 2.0 | 10.0 | 4.0 | — | — | — | 12.0 |
| $La_2O_3$ | 0.5 | 1.0 | 1.0 | 1.0 | 1.0 | — | 1.0 | 1.0 | 1.0 | 1.0 |
| $CeO_2$ | 0.5 | — | — | — | — | 0.5 | — | — | — | — |
| Stability | ○ | ○ | ○ | ○ | ○ | ○ | Δ | Δ | Δ | Δ |
| Working temperature (° C.) | 485 | 530 | 530 | 525 | 525 | 520 | 520 | 525 | 520 | 535 |
| Thermal expansion coefficient ($\times 10^{-7}$/° C.) | 124 | 103 | 103 | 105 | 106 | 102 | 105 | 103 | 103 | 102 |
| Mechanical strength (MPa) | 120 | 122 | 122 | 120 | 119 | 128 | 124 | 123 | 122 | 125 |
| Water resistance (mg/cm$^2$) | 0.4 | 0.3 | 0.3 | 0.4 | 0.3 | 0.3 | 0.2 | 0.3 | 0.3 | 0.3 |

TABLE 9

| | | Example | | | | Comparative Example | | | | |
|---|---|---|---|---|---|---|---|---|---|---|
| No. | | 59 | 60 | 61 | 62 | 63 | 64 | 65 | 66 | 67 |
| Composition (wt %) | $SiO_2$ | 4.0 | 4.0 | 4.0 | 4.0 | 3.0 | 3.0 | 3.0 | 3.0 | 3.0 |
| | $B_2O_3$ | 5.0 | 5.0 | 5.0 | 5.0 | 4.0 | 4.0 | 4.0 | 4.0 | 4.0 |
| | ZnO | 8.5 | 8.5 | 8.5 | 8.5 | 8.5 | 8.5 | 8.5 | 8.5 | 8.5 |
| | $Bi_2O_3$ | 69.5 | 69.5 | 69.5 | 69.5 | 69.5 | 69.5 | 69.5 | 69.5 | 69.5 |
| | $Al_2O_3$ | 0.5 | 0.5 | 0.5 | 0.5 | 0.5 | 0.5 | 0.5 | 0.5 | 0.5 |
| | MgO | 5.0 | 1.0 | — | — | 3.0 | 14.0 | — | — | — |
| | CaO | 3.0 | 6.0 | 1.0 | 1.0 | 3.0 | — | 14.0 | — | — |
| | SrO | — | 2.0 | 8.0 | 1.0 | 4.0 | — | — | 14.0 | — |
| | BaO | 4.0 | 3.0 | 3.0 | 10.0 | 4.0 | — | — | — | 14.0 |
| | $La_2O_3$ | — | — | — | — | — | — | — | — | — |
| | $CeO_2$ | 0.5 | 0.5 | 0.5 | 0.5 | 0.5 | 0.5 | 0.5 | 0.5 | 0.5 |
| Stability | | Δ | Δ | Δ | Δ | X | X | X | X | X |
| Working temperature (° C.) | | 525 | 520 | 520 | 520 | — | — | — | — | — |
| Thermal expansion coefficient ($\times 10^{-7}$/° C.) | | 100 | 102 | 102 | 104 | — | — | — | — | — |
| Mechanical strength (MPa) | | 122 | 122 | 121 | 123 | — | — | — | — | — |
| Water resistance (mg/cm$^2$) | | 0.4 | 0.3 | 0.3 | 0.3 | — | — | — | — | — |

Though MgO, CaO, SrO and BaO are not always essential components, a glass composition having stability is obtained if at least one or more of them is contained.

As clearly shown in Tables 8 and 9, when the total content of MgO, CaO, SrO and BaO was 14 wt %, the glass composition was devitrified in the manufacture thereof, thereby the glass was not obtained with stability. Accordingly, the total content of MgO, CaO, SrO and BaO is preferably 12 wt % or less.

Further, when the MgO content was 6.0 wt %, the CaO content was 7.0 wt %, the SrO content was 9.0 wt % and the BaO content was 12.0 wt %, the crystal precipitation was apt to occur in the glass in the heat treatment of the glass composition after the manufacture thereof. In order to suppress this, it is preferable to set the MgO content to 5 wt % or less, the CaO content to 6 wt % or less, the SrO content to 8 wt % or less and the BaO content to 10 wt % or less, and the total content of them to 10 wt % or less.

Tables 10 to 15 show the glass compositions manufactured to make a study of the contents of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$. The glass compositions of Nos. 69 to 100 are Examples and those of Nos. 68 and 101 to 116 are Comparative Examples.

TABLE 10

| | | Comparative Example | Example | | | | | | |
|---|---|---|---|---|---|---|---|---|---|
| No. | | 68 | 69 | 70 | 71 | 72 | 73 | 74 | 75 |
| Composition (wt %) | $SiO_2$ | 4.8 | 4.8 | 4.8 | 4.8 | 4.8 | 4.8 | 4.8 | 4.8 |
| | $B_2O_3$ | 7.6 | 7.6 | 7.6 | 7.6 | 7.6 | 7.6 | 7.6 | 7.6 |
| | ZnO | 12.9 | 12.9 | 12.9 | 12.9 | 12.9 | 12.9 | 12.9 | 12.9 |
| | $Bi_2O_3$ | 73.7 | 73.6 | 73.6 | 73.6 | 73.6 | 73.6 | 73.6 | 73.6 |
| | $Al_2O_3$ | 1.0 | 1.0 | 1.0 | 1.0 | 1.0 | 1.0 | 1.0 | 1.0 |
| | $Sc_2O_3$ | — | 0.1 | — | — | — | — | — | — |
| | $Y_2O_3$ | — | — | 0.1 | — | — | — | — | — |
| | $La_2O_3$ | — | — | — | 0.1 | — | — | — | — |
| | $CeO_2$ | — | — | — | — | 0.1 | — | — | — |
| | $Pr_2O_3$ | — | — | — | — | — | 0.1 | — | — |
| | $Nd_2O_3$ | — | — | — | — | — | — | 0.1 | — |
| | $Sm_2O_3$ | — | — | — | — | — | — | — | 0.1 |

TABLE 10-continued

|  | Comparative Example | Example | | | | | | |
|---|---|---|---|---|---|---|---|---|
| No. | 68 | 69 | 70 | 71 | 72 | 73 | 74 | 75 |
| Stability | ◯ | ◯ | ◯ | ◯ | ◯ | ◯ | ◯ | ◯ |
| Working temperature (° C.) | 570 | 570 | 570 | 570 | 570 | 570 | 570 | 570 |
| Thermal expansion coefficient ($\times 10^{-7}$/° C.) | 88 | 88 | 88 | 87 | 88 | 88 | 88 | 88 |
| Mechanical strength (MPa) | 95 | 111 | 112 | 113 | 111 | 110 | 112 | 111 |
| Water resistance (mg/cm$^2$) | 0.2 | 0.2 | 0.1 | 0.2 | 0.2 | 0.3 | 0.2 | 0.2 |

TABLE 11

|  |  | Example | | | | | | | |
|---|---|---|---|---|---|---|---|---|---|
| No. |  | 76 | 77 | 78 | 79 | 80 | 81 | 82 | 83 |
| Composition (wt %) | SiO$_2$ | 4.8 | 4.8 | 4.8 | 4.8 | 4.8 | 4.8 | 4.8 | 4.8 |
|  | B$_2$O$_3$ | 7.6 | 7.6 | 7.6 | 7.6 | 7.6 | 7.6 | 7.6 | 7.6 |
|  | ZnO | 12.9 | 12.9 | 12.9 | 12.9 | 12.9 | 12.9 | 12.9 | 12.9 |
|  | Bi$_2$O$_3$ | 73.6 | 73.6 | 73.6 | 73.6 | 73.6 | 73.6 | 73.6 | 73.6 |
|  | Al$_2$O$_3$ | 1.0 | 1.0 | 1.0 | 1.0 | 1.0 | 1.0 | 1.0 | 1.0 |
|  | Eu$_2$O$_3$ | 0.1 | — | — | — | — | — | — | — |
|  | Gd$_2$O$_3$ | — | 0.1 | — | — | — | — | — | — |
|  | Tb$_2$O$_3$ | — | — | 0.1 | — | — | — | — | — |
|  | Dy$_2$O$_3$ | — | — | — | 0.1 | — | — | — | — |
|  | Ho$_2$O$_3$ | — | — | — | — | 0.1 | — | — | — |
|  | Er$_2$O$_3$ | — | — | — | — | — | 0.1 | — | — |
|  | Tm$_2$O$_3$ | — | — | — | — | — | — | 0.1 | — |
|  | Yb$_2$O$_3$ | — | — | — | — | — | — | — | 0.1 |
| Stability |  | ◯ | ◯ | ◯ | ◯ | ◯ | ◯ | ◯ | ◯ |
| Working temperature (° C.) |  | 570 | 570 | 570 | 570 | 570 | 570 | 570 | 570 |
| Thermal expansion coefficient ($\times 10^{-7}$/° C.) |  | 88 | 88 | 88 | 88 | 88 | 87 | 88 | 88 |
| Mechanical strength (MPa) |  | 111 | 113 | 112 | 110 | 111 | 110 | 112 | 110 |
| Water resistance (mg/cm$^2$) |  | 0.2 | 0.1 | 0.2 | 0.2 | 0.1 | 0.2 | 0.2 | 0.2 |

TABLE 12

|  |  | Example | | | | | | | |
|---|---|---|---|---|---|---|---|---|---|
| No. |  | 84 | 85 | 86 | 87 | 88 | 89 | 90 | 91 |
| Composition (wt %) | SiO$_2$ | 4.8 | 4.3 | 4.3 | 4.3 | 4.3 | 4.3 | 4.3 | 4.3 |
|  | B$_2$O$_3$ | 7.6 | 6.8 | 6.8 | 6.8 | 6.8 | 6.8 | 6.8 | 6.8 |
|  | ZnO | 12.9 | 11.6 | 11.6 | 11.6 | 11.6 | 11.6 | 11.6 | 11.6 |
|  | Bi$_2$O$_3$ | 73.6 | 66.3 | 66.3 | 66.3 | 66.3 | 66.3 | 66.3 | 66.3 |
|  | Al$_2$O$_3$ | 1.0 | 1.0 | 1.0 | 1.0 | 1.0 | 1.0 | 1.0 | 1.0 |
|  | Sc$_2$O$_3$ | — | 10.0 | — | — | — | — | — | — |
|  | Y$_2$O$_3$ | — | — | 10.0 | — | — | — | — | — |
|  | La$_2$O$_3$ | — | — | — | 10.0 | — | — | — | — |
|  | CeO$_2$ | — | — | — | — | 10.0 | — | — | — |
|  | Pr$_2$O$_3$ | — | — | — | — | — | 10.0 | — | — |
|  | Nd$_2$O$_3$ | — | — | — | — | — | — | 10.0 | — |
|  | Sm$_2$O$_3$ | — | — | — | — | — | — | — | 10.0 |
|  | Lu$_2$O$_3$ | 0.1 | — | — | — | — | — | — | — |
| Stability |  | ◯ | ◯ | ◯ | ◯ | ◯ | ◯ | ◯ | ◯ |
| Working temperature (° C.) |  | 570 | 575 | 575 | 575 | 575 | 575 | 575 | 575 |
| Thermal expansion coefficient ($\times 10^{-7}$/° C.) |  | 88 | 89 | 89 | 89 | 89 | 88 | 88 | 88 |
| Mechanical strength (MPa) |  | 111 | 128 | 129 | 128 | 129 | 130 | 128 | 128 |
| Water resistance (mg/cm$^2$) |  | 0.2 | 0.2 | 0.1 | 0.2 | 0.2 | 0.1 | 0.2 | 0.2 |

TABLE 13

| | No. | \multicolumn{9}{c}{Example} |
|---|---|---|---|---|---|---|---|---|---|---|
| | | 92 | 93 | 94 | 95 | 96 | 97 | 98 | 99 | 100 |
| Composition (wt %) | $SiO_2$ | 4.3 | 4.3 | 4.3 | 4.3 | 4.3 | 4.3 | 4.3 | 4.3 | 4.3 |
| | $B_2O_3$ | 6.8 | 6.8 | 6.8 | 6.8 | 6.8 | 6.8 | 6.8 | 6.8 | 6.8 |
| | ZnO | 11.6 | 11.6 | 11.6 | 11.6 | 11.6 | 11.6 | 11.6 | 11.6 | 11.6 |
| | $Bi_2O_3$ | 66.3 | 66.3 | 66.3 | 66.3 | 66.3 | 66.3 | 66.3 | 66.3 | 66.3 |
| | $Al_2O_3$ | 1.0 | 1.0 | 1.0 | 1.0 | 1.0 | 1.0 | 1.0 | 1.0 | 1.0 |
| | $Eu_2O_3$ | 10.0 | — | — | — | — | — | — | — | — |
| | $Gd_2O_3$ | — | 10.0 | — | — | — | — | — | — | — |
| | $Tb_2O_3$ | — | — | 10.0 | — | — | — | — | — | — |
| | $Dy_2O_3$ | — | — | — | 10.0 | — | — | — | — | — |
| | $Ho_2O_3$ | — | — | — | — | 10.0 | — | — | — | — |
| | $Er_2O_3$ | — | — | — | — | — | 10.0 | — | — | — |
| | $Tm_2O_3$ | — | — | — | — | — | — | 10.0 | — | — |
| | $Yb_2O_3$ | — | — | — | — | — | — | — | 10.0 | — |
| | $Lu_2O_3$ | — | — | — | — | — | — | — | — | 10.0 |
| Stability | | ◯ | ◯ | ◯ | ◯ | ◯ | ◯ | ◯ | ◯ | ◯ |
| Working temperature (° C.) | | 575 | 580 | 575 | 580 | 575 | 575 | 580 | 580 | 580 |
| Thermal expansion coefficient ($\times 10^{-7}$/° C.) | | 88 | 87 | 88 | 88 | 88 | 87 | 88 | 88 | 87 |
| Mechanical strength (MPa) | | 129 | 130 | 128 | 129 | 127 | 128 | 128 | 129 | 127 |
| Water resistance (mg/cm$^2$) | | 0.2 | 0.2 | 0.2 | 0.3 | 0.2 | 0.2 | 0.2 | 0.2 | 0.2 |

TABLE 14

| | No. | \multicolumn{8}{c}{Comparative Example} |
|---|---|---|---|---|---|---|---|---|---|
| | | 101 | 102 | 103 | 104 | 105 | 106 | 107 | 108 |
| Composition (wt %) | $SiO_2$ | 4.3 | 4.3 | 4.3 | 4.3 | 4.3 | 4.3 | 4.3 | 4.3 |
| | $B_2O_3$ | 6.8 | 6.8 | 6.8 | 6.8 | 6.8 | 6.8 | 6.8 | 6.8 |
| | ZnO | 11.6 | 11.6 | 11.6 | 11.6 | 11.6 | 11.6 | 11.6 | 11.6 |
| | $Bi_2O_3$ | 64.3 | 64.3 | 64.3 | 64.3 | 64.3 | 64.3 | 64.3 | 64.3 |
| | $Al_2O_3$ | 1.0 | 1.0 | 1.0 | 1.0 | 1.0 | 1.0 | 1.0 | 1.0 |
| | $Sc_2O_3$ | 12.0 | — | — | — | — | — | — | — |
| | $Y_2O_3$ | — | 12.0 | — | — | — | — | — | — |
| | $La_2O_3$ | — | — | 12.0 | — | — | — | — | — |
| | $CeO_2$ | — | — | — | 12.0 | — | — | — | — |
| | $Pr_2O_3$ | — | — | — | — | 12.0 | — | — | — |
| | $Nd_2O_3$ | — | — | — | — | — | 12.0 | — | — |
| | $Sm_2O_3$ | — | — | — | — | — | — | 12.0 | — |
| | $Eu_2O_3$ | — | — | — | — | — | — | — | 12.0 |
| Stability | | X | X | X | X | X | X | X | X |
| Working temperature (° C.) | | — | — | — | — | — | — | — | — |
| Thermal expansion coefficient ($\times 10^{-7}$/° C.) | | — | — | — | — | — | — | — | — |
| Mechanical strength (MPa) | | — | — | — | — | — | — | — | — |
| Water resistance (mg/cm$^2$) | | — | — | — | — | — | — | — | — |

TABLE 15

| | No. | \multicolumn{8}{c}{Comparative Example} |
|---|---|---|---|---|---|---|---|---|---|
| | | 109 | 110 | 111 | 112 | 113 | 114 | 115 | 116 |
| Composition (wt %) | $SiO_2$ | 4.3 | 4.3 | 4.3 | 4.3 | 4.3 | 4.3 | 4.3 | 4.3 |
| | $B_2O_3$ | 6.8 | 6.8 | 6.8 | 6.8 | 6.8 | 6.8 | 6.8 | 6.8 |
| | ZnO | 11.6 | 11.6 | 11.6 | 11.6 | 11.6 | 11.6 | 11.6 | 11.6 |
| | $Bi_2O_3$ | 64.3 | 64.3 | 64.3 | 64.3 | 64.3 | 64.3 | 64.3 | 64.3 |
| | $Al_2O_3$ | 1.0 | 1.0 | 1.0 | 1.0 | 1.0 | 1.0 | 1.0 | 1.0 |
| | $Gd_2O_3$ | 12.0 | — | — | — | — | — | — | — |
| | $Tb_2O_3$ | — | 12.0 | — | — | — | — | — | — |
| | $Dy_2O_3$ | — | — | 12.0 | — | — | — | — | — |
| | $Ho_2O_3$ | — | — | — | 12.0 | — | — | — | — |
| | $Er_2O_3$ | — | — | — | — | 12.0 | — | — | — |
| | $Tm_2O_3$ | — | — | — | — | — | 12.0 | — | — |
| | $Yb_2O_3$ | — | — | — | — | — | — | 12.0 | — |
| | $Lu_2O_3$ | — | — | — | — | — | — | — | 12.0 |
| Stability | | X | X | X | X | X | X | X | X |
| Working temperature (° C.) | | — | — | — | — | — | — | — | — |
| Thermal expansion coefficient ($\times 10^{-7}$/° C.) | | — | — | — | — | — | — | — | — |

TABLE 15-continued

|  | Comparative Example | | | | | | | |
|---|---|---|---|---|---|---|---|---|
| No. | 109 | 110 | 111 | 112 | 113 | 114 | 115 | 116 |
| Mechanical strength (MPa) | — | — | — | — | — | — | — | — |
| Water resistance (mg/cm$^2$) | — | — | — | — | — | — | — | — |

$Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ function to improve the mechanical strength of the glass composition.

As clearly shown in Tables 10 to 15, if higher mechanical strength is required for the sealing member, it is necessary to use a glass composition containing 0.1 wt % or more of at least one of them. However, if the total content of them was 12 wt % or more, the glass composition was devitrified in the manufacture thereof and the glass composition was not obtained with stability. Therefore, the total content of them is preferably 0.1 to 10 wt %.

Table 16 shows the glass compositions manufactured to make a study of the content of $Gd_2O_3$ among the above-listed rare-earth compounds. The glass compositions of Nos. 119 to 122 are Examples and those of Nos. 117 and 118 are Comparative Examples.

TABLE 16

|  |  | Comparative Example | | Example | | | |
|---|---|---|---|---|---|---|---|
| No. |  | 117 | 118 | 119 | 120 | 121 | 122 |
| Composition (wt %) | $SiO_2$ | 2.10 | 2.10 | 2.10 | 2.08 | 2.06 | 2.03 |
|  | $B_2O_3$ | 7.30 | 7.29 | 7.29 | 7.24 | 7.15 | 7.04 |
|  | ZnO | 13.27 | 13.26 | 13.26 | 13.17 | 13.01 | 12.81 |
|  | $Bi_2O_3$ | 75.97 | 75.93 | 75.90 | 75.37 | 74.46 | 73.31 |
|  | $Al_2O_3$ | 0.40 | 0.40 | 0.40 | 0.39 | 0.39 | 0.38 |
|  | $Na_2O$ | 0.96 | 0.96 | 0.96 | 0.95 | 0.94 | 0.93 |
|  | $Gd_2O_3$ | — | 0.06 | 0.10 | 0.80 | 2.00 | 3.50 |
| Stability |  | ○ | ○ | ○ | ○ | ○ | ○ |
| Working temperature (° C.) |  | 520 | 520 | 525 | 525 | 530 | 534 |
| Thermal expansion coefficient (×10$^{-7}$/° C.) |  | 99 | 99 | 98 | 99 | 98 | 99 |
| Mechanical strength (MPa) |  | 98 | 101 | 108 | 115 | 117 | 120 |
| Water resistance (mg/cm$^2$) |  | 0.3 | 0.2 | 0.3 | 0.2 | 0.2 | 0.2 |

As clearly shown in Table 16, when the $Gd_2O_3$ content was 0.1 to 3.5 wt %, high mechanical strength was obtained, thereby the thermal expansion coefficient was reduced.

Table 17 shows the glass compositions manufactured to make a study of the weight ratio of ZnO to $B_2O_3$ ($ZnO/B_2O_3$). The glass compositions of Nos. 124 to 126 are Examples and those of Nos. 123 and 127 are Comparative Examples.

TABLE 17

|  |  | Comparative Example | Example | | | Comparative Example |
|---|---|---|---|---|---|---|
| No. |  | 123 | 124 | 125 | 126 | 127 |
| Composition (wt %) | $SiO_2$ | 4.4 | 3.1 | 7.6 | 3.5 | 3.5 |
|  | $B_2O_3$ | 6.0 | 5.5 | 7.0 | 6.0 | 5.0 |
|  | ZnO | 4.2 | 4.4 | 13.3 | 16.8 | 17.0 |
|  | $Bi_2O_3$ | 80.9 | 81.5 | 68.7 | 72.3 | 73.1 |
|  | $Al_2O_3$ | 2.0 | 0.8 | 1.1 | 1.0 | 1.0 |
|  | $Na_2O$ | 2.0 | 1.2 | — | — | — |
|  | MgO | — | 3.0 | — | — | — |
|  | SrO | — | — | 0.9 | — | — |
|  | $La_2O_3$ | 0.5 | 0.5 | 1.4 | — | — |
|  | $CeO_2$ | — | — | — | 0.4 | 0.4 |
| $ZnO/B_2O_3$ |  | 0.7 | 0.8 | 1.9 | 2.8 | 3.4 |
| Stability |  | Δ | ○ | ○ | ○ | Δ |
| Working temperature (° C.) |  | 520 | 510 | 605 | 545 | 540 |
| Thermal expansion coefficient (×10$^{-7}$/° C.) |  | 113 | 118 | 86 | 85 | 87 |
| Mechanical strength (MPa) |  | 119 | 114 | 125 | 120 | 116 |
| Water resistance (mg/cm$^2$) |  | 0.4 | 0.4 | 1.0 | 0.2 | 0.0 |

As clearly shown in Table 17, when the weight ratio of ZnO to $B_2O_3$ is 0.7 or 3.4, the crystal precipitation is apt to occur in the glass in the heat treatment of the glass composition after the manufacture thereof, which may possibly cause a problem in maintaining hermeticity. Accordingly, to obtain a stable glass composition that hardly causes the crystal precipitation, the weight ratio of ZnO to $B_2O_3$ is preferably controlled to 0.8 to 2.8.

Table 18 shows the glass compositions manufactured to make a study of the weight ratio of $Al_2O_3$ to $SiO_2$ ($Al_2O_3/SiO_2$). The glass compositions of Nos. 128 to 130 are Examples and those of Nos. 131 and 132 are Comparative Examples.

TABLE 18

| | | Example | | | Comparative Example | |
|---|---|---|---|---|---|---|
| No. | | 128 | 129 | 130 | 131 | 132 |
| Composition (wt %) | $SiO_2$ | 3.4 | 4.0 | 5.0 | 4.0 | 2.0 |
| | $B_2O_3$ | 6.5 | 5.5 | 5.9 | 5.5 | 3.4 |
| | ZnO | 10.1 | 8.5 | 4.7 | 12.9 | 9.0 |
| | $Bi_2O_3$ | 78.3 | 72.9 | 79.0 | 72.7 | 82.6 |
| | $Al_2O_3$ | — | 1.2 | 2.5 | 2.4 | 1.8 |
| | $Li_2O$ | — | — | — | — | 1.1 |
| | $Na_2O$ | 1.2 | 0.4 | 2.0 | 1.2 | — |
| | SrO | — | 5.5 | — | — | — |
| | $La_2O_3$ | 0.5 | 2.0 | — | — | 0.1 |
| | $CeO_2$ | — | — | — | 0.3 | — |
| | $Gd_2O_3$ | — | — | — | 1.0 | — |
| | $Er_2O_3$ | — | — | 0.9 | — | — |
| $Al_2O_3/SiO_2$ | | 0.0 | 0.3 | 0.5 | 0.6 | 0.9 |
| Stability | | ○ | ○ | ○ | △ | △ |
| Working temperature (° C.) | | 515 | 520 | 530 | 550 | 475 |
| Thermal expansion coefficient ($\times 10^{-7}/°$ C.) | | 106 | 104 | 108 | 92 | 106 |
| Mechanical strength (MPa) | | 115 | 118 | 122 | 123 | 110 |
| Water resistance (mg/cm$^2$) | | 0.3 | 0.3 | 0.4 | 0.2 | 0.5 |

As clearly shown in Table 18, when the weight ratio of $Al_2O_3$ to $SiO_2$ is 0.6 or more, the crystal precipitation is apt to occur in the glass in the heat treatment of the glass composition after the manufacture thereof, which may possibly cause a problem in maintaining hermeticity. Accordingly, to obtain a stable glass composition that hardly causes the crystal precipitation, the weight ratio of $Al_2O_3$ to $SiO_2$ is preferably controlled to 0.5 or less.

Table 19 shows lead-containing glass compositions manufactured as Comparative Examples 133 to 139 to make a performance comparison with the bismuth glass composition.

TABLE 19

| | | Comparative Example | | | | | | |
|---|---|---|---|---|---|---|---|---|
| No. | | 133 | 134 | 135 | 136 | 137 | 138 | 139 |
| Composition (wt %) | $SiO_2$ | 0.7 | 1.5 | 9.9 | 3.0 | 16.5 | 15.2 | 23.5 |
| | $B_2O_3$ | 16.0 | 7.6 | 12.3 | 9.0 | 3.0 | 8.5 | 2.3 |
| | ZnO | 8.1 | 8.9 | 4.5 | 10.0 | 0.5 | 1.2 | 2.4 |
| | PbO | 73.7 | 78.6 | 70.4 | 74.0 | 79.5 | 68.5 | 65.3 |
| | $Al_2O_3$ | 0.5 | 0.4 | 1.6 | 1.0 | 0.5 | 4.7 | 3.2 |
| | $Na_2O$ | — | — | 1.3 | — | — | 1.9 | 3.3 |
| | $K_2O$ | 0.7 | 1.9 | — | — | — | — | — |
| | CaO | 0.3 | 1.1 | — | — | — | — | — |
| | BaO | — | — | — | 0.3 | — | — | — |
| Stability | | ○ | ○ | ○ | ○ | ○ | ○ | ○ |
| Working temperature (° C.) | | 480 | 480 | 540 | 490 | 530 | 630 | 650 |
| Thermal expansion coefficient ($\times 10^{-7}/°$ C.) | | 95 | 107 | 91 | 96 | 104 | 88 | 91 |
| Mechanical strength (MPa) | | 115 | 111 | 127 | 118 | 135 | 130 | 145 |
| Water resistance (mg/cm$^2$) | | 3.3 | 4.0 | 1.9 | 2.8 | 2.1 | 1.5 | 1.3 |

As clearly shown in Table 19, the lead-containing glasses, in every composition, showed the water resistance higher than 1.0 mg/cm$^2$. On the other hand, the bismuth glass composition of the present invention was lead free and showed the working temperature of 450 to 650° C., the thermal expansion coefficient of $70\times10^{-7}$ to $130\times10^{-7}/°$ C., mechanical strength equal to that of the lead-containing glass composition and excellent water resistance.

If the glass composition of the present invention is used as the sealing member for the magnetic head, the glass composition is preferably amorphous from the viewpoint of exhibiting flowability. However, depending on the applications of the glass composition, the glass composition may be crystallized by heat treatment.

Table 20 shows more preferable examples of the compositions of the bismuth glass composition of the present invention.

TABLE 20

| | | Example | | | | |
|---|---|---|---|---|---|---|
| No. | | 140 | 141 | 142 | 143 | 144 |
| Composition (wt %) | $SiO_2$ | 3.4 | 2.1 | 8.1 | 2.1 | 2.0 |
| | $B_2O_3$ | 6.7 | 7.2 | 5.7 | 7.2 | 7.0 |
| | ZnO | 12.5 | 13.2 | 13.3 | 13.2 | 12.8 |
| | $Bi_2O_3$ | 75.7 | 75.5 | 68.7 | 75.3 | 73.2 |
| | $Al_2O_3$ | 1.0 | 0.4 | 0.8 | 0.4 | 0.4 |
| | $Na_2O$ | 0.6 | 1.0 | 0.3 | 0.7 | 0.7 |
| | CaO | — | — | 1.2 | 0.4 | 0.4 |
| | SrO | — | — | 1.2 | — | — |
| | $La_2O_3$ | 0.1 | 0.6 | — | — | — |
| | $Nd_2O_3$ | — | — | 0.7 | — | — |
| | $Gd_2O_3$ | — | — | — | 0.7 | 3.5 |
| Stability | | ○ | ○ | ○ | ○ | ○ |
| Working temperature (° C.) | | 539 | 524 | 605 | 525 | 534 |
| Thermal expansion coefficient ($\times 10^{-7}/°$ C.) | | 97 | 98 | 87 | 99 | 99 |
| Mechanical strength (MPa) | | 126 | 120 | 138 | 123 | 130 |
| Water resistance (mg/cm$^2$) | | 0.3 | 0.4 | 0.1 | 0.3 | 0.2 |

The above-described glass compositions may be used in the form of bulk, powder, fiber or thin film for the manufacture of the magnetic head. However, the form of the glass composition is not limited thereto.

The glass composition or the sealing member for the magnetic head according to the present invention may be used as a material consisted of the glass composition only, or a composite material comprising a combination of the glass composition and other materials. The glass composition or the sealing member for the magnetic head may be crystallized by heat treatment or combined with other materials to be used as a composite material such that it can be used as a material having a thermal expansion coefficient higher than $70 \times 10^{-7}$ to $130 \times 10^{-7}/°C$.

The temperature for heat-treating the glass composition or the sealing member for the magnetic head according to the present invention is not limited to the working temperature of 450 to 650° C. It is needless to say that the temperature may be selected depending on the applications.

EXAMPLE 2

As an example of the present invention, a ferrite head shown in FIG. 4 was formed, with which a magnetic recording/reproducing device was manufactured.

Referring to FIG. 4, the glass composition of Example 17 was used as the sealing members 25 and 26, which were subjected to heat treatment at 610° C. to form a ferrite head 20. As ferrite for forming the magnetic core halves 22 and 23, Mn—Zn monocrystalline ferrite was used and quartz glass was used as the magnetic gap member 24.

The thus formed ferrite head was not cracked or broken and the sealing member was not eroded, exhibiting intended magnetic conversion properties. Further, the magnetic recording/reproducing device using the ferrite head was able to perform recording and reproducing with high reliability.

As a sealing member best for the ferrite head, the following glass composition is preferably used.

As the sealing member for the ferrite head, those mentioned as the above Examples may be used. In particular, due to a demand for high wear resistance to a magnetic recording medium, it is more preferable to set the $SiO_2$ content to 7 wt % or more.

In order to obtain a more stable sealing member for the magnetic head under these conditions, it is necessary to further adjust the content of each component. It is preferred that the composition comprises 7 to 12 wt % of $SiO_2$, 3 to 9 wt % of $B_2O_3$, 9.5 to 19 wt % or ZnO, 62 to 80 wt % of $Bi_2O_3$, 0.1 to 4 wt % of $Al_2O_3$, 0.1 to 5 wt % of at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

Further, in order to make an adjustment to obtain desired working temperature and thermal expansion coefficient, it is preferable to set the contents of $Li_2O$ to 2 wt % or less, $Na_2O$ to 3 wt % or less, $K_2O$ to 4 wt % or less, and the total content of them to 4 wt % or less. In addition, it is preferable to set the contents of MgO to 5 wt % or less, CaO to 6 wt % or less, SrO to 8 wt % or less, BaO to 10 wt % or less, and the total content of them to 10 wt % or less.

Moreover, in the above-described glass composition, the weight ratio of ZnO to $B_2O_3$ is preferably 0.8 to 2.8 and the weight ratio of $Al_2O_3$ to $SiO_2$ is preferably 0.5 or less.

EXAMPLE 3

As an example of the present invention, an MIG head shown in FIG. 5 was formed, with which a magnetic recording/reproducing device was manufactured.

Referring to FIG. 5, the glass composition of Example 71 was used as the sealing members 35 and 36, which were subjected to heat treatment at 525° C. to form an MIG head 30. As ferrite for forming the magnetic core halves 32 and 33, Mn—Zn monocrystalline ferrite was used. Fe—Ta—N films having saturated magnetic flux density (Bs) of 1.6 T were used as the magnetic metal films 37 and 38. Quartz glass was used as the magnetic gap member 34.

The thus formed MIG head was not cracked or broken and the sealing member was not eroded, exhibiting intended magnetic conversion properties. Further, the magnetic recording/reproducing device using the MIG head was able to perform recording and reproducing with high reliability.

As a sealing member best for the MIG head, the following glass composition is preferably used.

As the sealing member for the MIG head, those mentioned as the above Examples may be used. In particular, for the purpose of manufacturing the magnetic head in high yield, the sealing member is required to have high wettability to the magnetic core halves. To meet this requirement, it is more preferable to set the content of $SiO_2$ to 7 wt % or less. Further, in order to keep the wear resistance to the magnetic recording medium high, it is more preferable to set the content of $SiO_2$ to 1.7 wt % or more.

In order to obtain a more stable sealing member for the magnetic head under these conditions, it is necessary to further adjust the content of each component. It is preferred that the composition comprises 1.7 to 7 wt % of $SiO_2$, 3 to 9 wt % of $B_2O_3$, 9.5 to 19 wt % or ZnO, 68 to 80 wt % of $Bi_2O_3$, 0.1 to 4 wt % of $Al_2O_3$, 0.1 to 5 wt % of at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

Further, in order to make an adjustment to obtain desired working temperature and thermal expansion coefficient, it is preferable to set the contents of $Li_2O$ to 2 wt % or less, $Na_2O$ to 3 wt % or less, $K_2O$ to 4 wt % or less, and the total content of them to 4 wt % or less. In addition, it is preferable to set the contents of MgO to 5 wt % or less, CaO to 6 wt % or less, SrO to 8 wt % or less, BaO to 10 wt % or less, and the total content of them to 10 wt % or less.

Moreover, in the above-described glass composition, the weight ratio of ZnO to $B_2O_3$ is preferably 0.8 to 2.8 and the weight ratio of $Al_2O_3$ to $SiO_2$ is preferably 0.5 or less.

EXAMPLE 4

As an example of the present invention, a stacked head shown in FIG. 6 was formed, with which a magnetic recording/reproducing device was manufactured.

Referring to FIG. 6, the glass composition of Example 141 was used as the sealing members 45, 46 and 47, which were subjected to heat treatment at 490° C. to form a stacked head 40. A Co—Ta—Zr—Nb alloy having saturated magnetic flux density (Bs) of 0.8 T was used as the magnetic metal film 53. Quartz glass was used as the insulating film 54, a ceramic substrate comprising MgO—NiO—$TiO_2$ was used as the nonmagnetic substrates 51 and 52, and quartz glass was used as the magnetic gap member 44.

The thus formed stacked head was not cracked or broken and the sealing member was not eroded, exhibiting intended magnetic conversion properties. Further, the magnetic recording/reproducing device using the stacked head was able to perform recording and reproducing with high reliability.

As a sealing member best for the stacked head, the following glass composition is preferably used.

As the sealing member for the stacked head, those mentioned as the above Examples may be used. In particular, in order to prevent deterioration of other members in the heat treatment, it is required to form the magnetic head by heat treatment at a low temperature not higher than 500° C. To meet the requirement, it is preferable to set the content of $SiO_2$ to 5 wt % or less. Further, to maintain the wear resistance to the magnetic recording medium, it is more preferable to set the content of $SiO_2$ to 1.7 wt % or more.

In order to obtain a more stable sealing member for the magnetic head under these conditions, it is necessary to further adjust the content of each component. It is preferred that the composition comprises 1.7 to 5 wt % of $SiO_2$, 3 to 9 wt % of $B_2O_3$, 9.5 to 19 wt % or ZnO, 68 to 80 wt % of $Bi_2O_3$, 0.1 to 4 wt % of $Al_2O_3$, 0.1 to 5 wt % of at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$.

Further, in order to make an adjustment to obtain desired working temperature and thermal expansion coefficient, it is preferable to set the contents of $Li_2O$ to 2 wt % or less, $Na_2O$ to 3 wt % or less, $K_2O$ to 4 wt % or less, and the total content of them to 4 wt % or less. Further, it is preferable to set the contents of MgO to 5 wt % or less, CaO to 6 wt % or less, SrO to 8 wt % or less, BaO to 10 wt % or less, and the total content of them to 10 wt % or less.

Moreover, in the above-described glass composition, the weight ratio of ZnO to $B_2O_3$ is preferably 0.8 to 2.8 and the weight ratio of $Al_2O_3$ to $SiO_2$ is preferably 0.5 or less.

EXAMPLE 5

Tables 21 to 39 show Examples of the bismuth glass composition according to the present invention used as the sealing member for a PDP, as well as Comparative Examples.

After the predetermined materials were mixed, the obtained mixture was placed in a platinum crucible and melted in an electric furnace at 900 to 1100° C. for 1 hour. Then, the obtained molten glass was quenched with a roller to form a glass composition. Tables 21 to 39 show the composition, glass stability, softening point, thermal expansion coefficient, water resistance and strength of the obtained glass compositions.

The glass stability, softening point, thermal expansion coefficient, water resistance and strength were evaluated in the following manner.

[Stability]

After the manufacture of the glass composition, the glass stability was judged from whether or not precipitation of crystals was caused from the glassy state in heat treatment performed at a temperature higher than each softening point by 50° C. for 30 minutes. The stability was indicated by ◯ when the glass composition was not devitrified in the manufacture thereof and did not cause the crystal precipitation in the heat treatment at the above-described test temperature, Δ when the glass composition was not devitrified in the manufacture thereof but caused the crystal precipitation in the heat treatment at the above-described test temperature, or X when the glass composition was devitrified in the manufacture thereof and the glass composition was not obtained. The glass composition for the sealing member for a PDP may be crystallized after the heat treatment. However, if it is necessary to carry out the heat treatment several times depending on the process, it is preferable that the glass composition does not change in physical property due to the crystallization. It is more preferable that a stable amorphous phase is maintained.

[Softening Point]

The softening point was determined in conformity with a test method of JIS R3103-1. More specifically, the glass composition was re-fused to be a melt having a suitable viscosity, from which a glass fiber of 0.55 to 0.75 mm in diameter and 234 to 236 mm in length was drawn. In an oven in which the glass fiber was suspended, temperature was raised to determine the temperature at which the glass fiber was stretched by its own weight at a rate of 1 mm per minute.

In a step of sealing a PDP, if the heat treatment is carried out at around a temperature higher than the softening point of the glass composition by 50° C., the glass composition in the sealing member is enough liquidized and the front plate and the rear plate are well bonded. Accordingly, to perform the sealing at a treatment temperature not higher than 500° C., a glass composition having a softening point of 450° C. or less is preferably selected.

[Thermal Expansion Coefficient]

The glass composition was re-fused, poured into a mold and cooled to form a glass rod of 4 mm in diameter and 20 mm in length. Under heating at 10° C./min, linear expansivity of the glass rod was measured. Then, an average thermal expansion coefficient at 30 to 300° C. was calculated.

[Water Resistance]

A glass composition having a particle diameter of 250 to 425 μm, equivalent to apparent volume of 1 $cm^3$, was immersed into boiling ion-exchanged water for an hour. The water resistance was then evaluated from a rate of decrease in weight of the glass composition (%). The smaller the rate of decrease in weight is, the more excellent the water resistance is. Regarding a PDP, 1.5 wt % or less is preferable.

[Mechanical Strength]

Mechanical strength was measured by a three-point bending method. The glass composition was re-fused Lo be a melt having a suitable viscosity, from which a glass rod of 1 mm in diameter and 30 mm in length was drawn. The glass rod was held horizontally by two points at an interval of 20 mm at the center portion thereof, and a load was applied to the center between the two points from above by a load cell at a rate of 1 mm/min. Based on the load that broke the glass rod, the mechanical strength was calculated.

Table 21 shows the glass compositions manufactured to make a study of the content of $SiO_2$. The glass compositions of Nos. 203 to 206 are Examples and those of Nos. 201, 202 and 207 are Comparative Examples.

TABLE 21

|  |  | Comparative Example | | Example | | | | Comparative Example |
| --- | --- | --- | --- | --- | --- | --- | --- | --- |
| No. | | 201 | 202 | 203 | 204 | 204 | 206 | 207 |
| Composition (wt %) | $SiO_2$ | 0.3 | 0.8 | 1.1 | 3.4 | 4.0 | 4.5 | 4.9 |
| | $B_2O_3$ | 5.7 | 8.0 | 6.4 | 6.5 | 4.7 | 5.9 | 9.8 |
| | ZnO | 10.3 | 9.5 | 12.8 | 10.6 | 11.6 | 11.9 | 9.9 |
| | $Bi_2O_3$ | 80.1 | 79.2 | 77.6 | 78.3 | 79.0 | 76.2 | 75.4 |
| | $Al_2O_3$ | 0.1 | — | 0.1 | — | 0.1 | 0.5 | — |
| | $Na_2O$ | 3.5 | 0.5 | 2.0 | 1.2 | 0.6 | 1.0 | — |
| | MgO | — | 2.0 | — | — | — | — | — |
| Stability | | X | X | ○ | ○ | ○ | Δ | Δ |
| Softening point (° C.) | | — | — | 410 | 435 | 444 | 450 | 486 |
| Thermal expansion coefficient ($\times 10^{-7}$/° C.) | | — | — | 108 | 106 | 100 | 100 | 94 |
| Water resistance (%) | | — | — | 0.4 | 0.2 | 0.2 | 0.1 | 0.1 |
| Mechanical strength (MPa) | | — | — | 72 | 78 | 81 | 80 | 81 |

As clearly shown in Table 21, when the $SiO_2$ content was 0.3 wt % or 0.8 wt %! the glass composition was devitrified in the manufacture thereof, thereby the glass composition was not obtained with stability. When the $SiO_2$ content was 4.9 wt %, the softening point was 486° C., which exceeded 450° C. From the above results, the $SiO_2$ content is preferably 1.1 to 4.5 wt %.

Further, when the $SiO_2$ content is 4.5 wt %, crystal precipitation is apt to occur in the glass in the heat treatment of the glass composition after the manufacture thereof, which may cause a problem in maintaining hermeticity. Therefore, in order to reduce the crystal precipitation in the glass, the $SiO_2$ content is preferably 1.1 to 4 wt %.

Table 22 shows the glass compositions manufactured to make a study of the content of $B_2O_3$. The glass compositions of Nos. 209 to 211 are Examples and those of Nos. 208 and 212 are Comparative Examples.

TABLE 22

|  |  | Comparative Example | Example | | | Comparative Example |
| --- | --- | --- | --- | --- | --- | --- |
| No. | | 208 | 209 | 210 | 211 | 212 |
| Composition (wt %) | $SiO_2$ | 4.0 | 3.4 | 1.2 | 2.7 | 4.4 |
| | $B_2O_3$ | 2.3 | 4.0 | 7.4 | 9.0 | 10.6 |
| | ZnO | 16.2 | 10.0 | 16.1 | 9.9 | 10.6 |
| | $Bi_2O_3$ | 77.5 | 76.2 | 73.7 | 77.1 | 72.4 |
| | $Al_2O_3$ | — | 1.0 | 0.2 | 0.2 | — |
| | $Li_2O$ | — | 1.5 | — | — | — |
| | $Na_2O$ | — | — | 1.2 | 1.1 | — |
| | $K_2O$ | — | — | — | — | 2.0 |
| | SrO | — | 3.9 | — | — | — |
| | $La_2O_3$ | — | — | 0.2 | — | — |
| Stability | | X | ○ | ○ | ○ | X |
| Softening point (° C.) | | — | 407 | 433 | 449 | — |
| Thermal expansion coefficient ($\times 10^{-7}$/° C.) | | — | 110 | 103 | 104 | — |
| Water resistance (%) | | — | 0.3 | 0.2 | 0.3 | — |
| Mechanical strength (MPa) | | — | 80 | 79 | 81 | — |

As clearly shown in Table 22, when the $B_2O_3$ content was 2.3 wt % or 10.6 wt %, the glass composition was devitrified in the manufacture thereof, thereby the glass composition was not obtained with stability. Therefore, the $B_2O_3$ content is preferably 4 to 9 wt %.

Table 23 shows the glass compositions manufactured to make a study of the content of ZnO. The glass compositions of Nos. 214 to 216 are Examples and those of Nos. 213 and 217 are Comparative Examples.

TABLE 23

|  |  | Comparative Example | Example | | | Comparative Example |
| --- | --- | --- | --- | --- | --- | --- |
| No. | | 213 | 214 | 215 | 216 | 217 |
| Composition (wt %) | $SiO_2$ | 2.1 | 3.3 | 1.1 | 1.2 | 3.1 |
| | $B_2O_3$ | 6.2 | 5.8 | 7.1 | 7.3 | 4.5 |
| | ZnO | 7.6 | 9.5 | 13.5 | 18.0 | 19.2 |
| | $Bi_2O_3$ | 81.7 | 80.0 | 76.1 | 72.8 | 72.0 |
| | $Al_2O_3$ | 0.9 | 0.9 | 0.2 | 0.1 | 0.5 |
| | $Li_2O$ | — | — | 0.9 | — | — |
| | $Na_2O$ | — | 0.5 | — | 0.6 | 0.7 |
| | $K_2O$ | 0.5 | — | — | — | — |
| | MgO | 1.0 | — | — | — | — |
| | SrO | — | — | 1.0 | — | — |
| | $La_2O_3$ | — | — | 0.1 | — | — |
| Stability | | ○ | ○ | ○ | ○ | X |
| Softening point (° C.) | | 440 | 448 | 413 | 437 | — |
| Thermal expansion coefficient ($\times 10^{-7}$/° C.) | | 103 | 101 | 105 | 97 | — |
| Water resistance (%) | | 1.6 | 0.5 | 0.3 | 0.2 | — |
| Mechanical strength (MPa) | | 81 | 82 | 77 | 79 | — |

As clearly shown in Table 23, when the ZnO content was 7.6 wt %, the weight decrease rate representing the water resistance was 1.6%, which exceeded 1.5%. When the ZnO content was 19.2 wt %, the glass composition was devitrified in the manufacture thereof, thereby the glass composition was not obtained with stability. Therefore, the ZnO content is preferably 9.5 to 18 wt %.

Table 24 shows the glass compositions manufactured to make a study of the content of $Bi_2O_3$. The glass compositions of Nos. 219 to 222 are Examples and those of Nos. 218 and 223 are Comparative Examples.

As clearly shown in Table 24, when the $Bi_2O_3$ content was 70.4 wt %, the softening point was 491° C., which exceeded 450° C. When the $Bi_2O_3$ content was 87.4 wt %, the glass composition was devitrified in the manufacture thereof, thereby the glass composition was not obtained with stability. Therefore, the $Bi_2O_3$ content is preferably 72 to 85 wt %.

Further, when the $Bi_2O_3$ content is 85.0 wt %, crystal precipitation is apt to occur in the glass in the heat treatment of the glass composition after the manufacture thereof, which may cause a problem in maintaining hermeticity. Therefore, in order to reduce the crystal precipitation in the glass, the $Bi_2O_3$ content is preferably 72 to 82 wt %.

TABLE 24

|  |  | Comparative Example | Example | | | | Comparative Example |
| --- | --- | --- | --- | --- | --- | --- | --- |
| No. | | 218 | 219 | 220 | 221 | 222 | 223 |
| Composition (wt %) | $SiO_2$ | 4.5 | 3.5 | 1.5 | 2.0 | 1.5 | 3.5 |
| | $B_2O_3$ | 7.6 | 6.3 | 6.1 | 5.5 | 4.0 | 2.0 |
| | ZnO | 13.0 | 10.9 | 11.7 | 9.5 | 9.5 | 7.1 |
| | $Bi_2O_3$ | 70.4 | 72.0 | 79.5 | 82.0 | 85.0 | 87.4 |
| | $Al_2O_3$ | 1.0 | 1.1 | 0.1 | 0.8 | — | — |
| | $Na_2O$ | — | 1.0 | — | 0.2 | — | — |
| | $K_2O$ | 0.4 | 1.2 | — | — | — | — |
| | MgO | 1.6 | — | — | — | — | — |
| | CaO | — | — | 1.0 | — | — | — |
| | SrO | 1.5 | — | — | — | — | — |
| | BaO | — | 4.0 | — | — | — | — |
| | $La_2O_3$ | — | — | 0.1 | — | — | — |
| Stability | | ○ | ○ | ○ | ○ | Δ | X |
| Softening point (° C.) | | 491 | 446 | 441 | 433 | 415 | — |
| Thermal expansion coefficient ($\times 10^{-7}$/° C.) | | 92 | 105 | 101 | 105 | 106 | — |
| Water resistance (%) | | 0.1 | 0.2 | 0.1 | 0.3 | 0.4 | — |
| Mechanical strength (MPa) | | 85 | 81 | 78 | 77 | 74 | — |

Table 25 shows the glass compositions manufactured to make a study of the content of $Al_2O_3$. The glass compositions of Nos. 224 to 227 are Examples and the glass composition of No. 228 is Comparative Example.

Further, in order to keep the glassy state stable and to reduce the crystals precipitated in the glass in the heat treatment after the manufacture thereof, the $Al_2O_3$ content is preferably 0.1 wt % or more.

TABLE 25

| No. | | Example | | | | Comparative Example |
|---|---|---|---|---|---|---|
| | | 224 | 225 | 226 | 227 | 228 |
| Composition (wt %) | $SiO_2$ | 3.4 | 1.8 | 1.1 | 4.0 | 4.3 |
| | $B_2O_3$ | 6.5 | 7.0 | 5.1 | 5.1 | 5.8 |
| | ZnO | 10.6 | 13.1 | 11.6 | 10.9 | 11.8 |
| | $Bi_2O_3$ | 78.3 | 76.0 | 81.0 | 76.8 | 72.2 |
| | $Al_2O_3$ | — | 0.1 | 0.2 | 2.0 | 2.7 |
| | $Li_2O$ | — | 0.1 | — | — | — |
| | $Na_2O$ | 1.2 | 0.7 | — | 1.0 | 0.6 |
| | CaO | — | 0.4 | — | 0.2 | 0.9 |
| | SrO | — | 0.8 | 0.9 | — | 1.7 |
| | $La_2O_3$ | — | — | 0.1 | — | — |
| Stability | | ○ | ○ | ○ | ○ | ○ |
| Softening point (° C.) | | 435 | 436 | 420 | 450 | 471 |
| Thermal expansion coefficient ($\times 10^{-7}$/° C.) | | 106 | 104 | 103 | 100 | 97 |
| Water resistance (%) | | 0.2 | 0.3 | 0.2 | 0.1 | 0.1 |
| Mechanical strength (MPa) | | 78 | 77 | 75 | 80 | 82 |

Though $Al_2O_3$ is not always an essential component, it functions to accelerate the vitrification of the glass composition and improve the water resistance. As clearly shown in Table 25, when the $Al_2O_3$ content was 2.7 wt %, the softening point was 471° C., which exceeded 450° C. Therefore, the $Al_2O_3$ content is preferably 2 wt % or less.

Tables 26 and 27 show the glass compositions manufactured to make a study of the contents of $Li_2O$, $Na_2O$ and $K_2O$. The glass compositions of Nos. 229 to 237 are Examples and those of Nos. 238 to 242 are Comparative Examples.

TABLE 26

| No. | | Example | | | | | | |
|---|---|---|---|---|---|---|---|---|
| | | 229 | 230 | 231 | 232 | 233 | 234 | 235 |
| Composition (wt %) | $SiO_2$ | 1.9 | 1.9 | 1.9 | 1.9 | 1.9 | 1.9 | 1.9 |
| | $B_2O_3$ | 6.9 | 6.9 | 6.9 | 6.9 | 6.9 | 6.9 | 6.9 |
| | ZnO | 12.0 | 12.0 | 12.0 | 12.0 | 12.0 | 12.0 | 12.0 |
| | $Bi_2O_3$ | 79.0 | 77.0 | 77.0 | 77.0 | 75.0 | 75.0 | 75.0 |
| | $Al_2O_3$ | 0.2 | 0.2 | 0.2 | 0.2 | 0.2 | 0.2 | 0.2 |
| | $Li_2O$ | — | 2.0 | — | — | 2.0 | 1.0 | 4.0 |
| | $Na_2O$ | — | — | 2.0 | — | — | 2.0 | — |
| | $K_2O$ | — | — | — | 2.0 | 2.0 | 1.0 | — |
| Stability | | ○ | ○ | ○ | ○ | ○ | ○ | Δ |
| Softening point (° C.) | | 445 | 381 | 419 | 431 | 372 | 387 | 369 |
| Thermal expansion Coefficient ($\times 10^{-7}$/° C.) | | 97 | 112 | 112 | 105 | 119 | 123 | 126 |
| Water resistance (%) | | 0.1 | 0.3 | 0.3 | 0.3 | 0.3 | 0.4 | 0.5 |
| Mechanical strength (MPa) | | 80 | 75 | 77 | 74 | 69 | 70 | 68 |

TABLE 27

| No. | | Example | | Comparative Example | | | | |
|---|---|---|---|---|---|---|---|---|
| | | 236 | 237 | 238 | 239 | 240 | 241 | 242 |
| Composition (wt %) | $SiO_2$ | 1.9 | 1.9 | 1.9 | 1.9 | 1.9 | 1.9 | 1.9 |
| | $B_2O_3$ | 6.9 | 6.9 | 6.9 | 6.9 | 6.9 | 6.9 | 6.9 |
| | ZnO | 12.0 | 12.0 | 12.0 | 12.0 | 12.0 | 12.0 | 12.0 |
| | $Bi_2O_3$ | 75.0 | 75.0 | 74.0 | 74.0 | 74.0 | 74.0 | 74.0 |
| | $Al_2O_3$ | 0.2 | 0.2 | 0.2 | 0.2 | 0.2 | 0.2 | 0.2 |
| | $Li_2O$ | — | — | 2.0 | 1.0 | 5.0 | — | — |
| | $Na_2O$ | 4.0 | — | 2.0 | 2.0 | — | 5.0 | — |
| | $K_2O$ | — | 4.0 | 1.0 | 2.0 | — | — | 5.0 |
| Stability | | ○ | Δ | Δ | Δ | Δ | Δ | Δ |
| Softening point (° C.) | | 394 | 438 | 360 | 385 | 360 | 381 | 437 |

TABLE 27-continued

|  | Example | | Comparative Example | | | | |
|---|---|---|---|---|---|---|---|
| No. | 236 | 237 | 238 | 239 | 240 | 241 | 242 |
| Thermal expansion Coefficient (×10$^{-7}$/° C.) | 126 | 111 | 130 | 126 | 134 | 133 | 114 |
| Water resistance (%) | 0.4 | 0.5 | 1.6 | 1.6 | 1.7 | 1.7 | 1.8 |
| Mechanical strength (MPa) | 71 | 76 | 68 | 70 | 67 | 69 | 78 |

Though $Li_2O$, $Na_2O$ and $K_2O$ are not always essential components, the softening point of the glass composition is lowered if at least one or more of them is contained. As clearly shown in Comparative Examples Nos. 238 to 242, if the total content of $Li_2O$, $Na_2O$ and $K_2O$ was 5.0 wt %, the water resistance was 1.6 to 1.8%, which exceeded 1.5%. Therefore, the total content of $Li_2O$, $Na_2O$ and $K_2O$ is preferably 4 wt % or less.

When the $Li_2O$ content is 4.0 wt % and the $K_2O$ content is 4.0 wt %, the crystal precipitation is apt to occur in the glass in the heat treatment of the glass composition after the manufacture thereof, which may possibly cause a problem in maintaining hermeticity. Therefore, in order to reduce the crystal precipitation in the glass, it is more preferable that the contents of $Li_2O$ and $K_2O$ are 2 wt % or less, respectively.

In particular, $Na_2O$ is the most effective for maintaining the glass composition stable, though the softening point is low.

However, if the insulating properties are concerned, it is preferable to contain $Li_2O$, $Na_2O$ and $K_2O$ in an amount as small as possible or not to contain them.

Tables 28 to 30 show the glass compositions manufactured to make a study of the contents of MgO, CaO, SrO and BaO. The glass compositions of Nos. 243 to 261 are Examples and those of Nos. 262 and 266 are Comparative Examples.

TABLE 28

|  |  | Example | | | | | | | |
|---|---|---|---|---|---|---|---|---|---|
| No. |  | 243 | 244 | 245 | 246 | 247 | 248 | 249 | 250 |
| Composition (wt %) | $SiO_2$ | 1.3 | 1.3 | 1.3 | 1.3 | 1.3 | 1.3 | 1.3 | 1.3 |
|  | $B_2O_3$ | 5.3 | 5.3 | 5.3 | 5.3 | 5.3 | 5.3 | 5.3 | 5.3 |
|  | ZnO | 10.0 | 10.0 | 10.0 | 10.0 | 10.0 | 10.0 | 10.0 | 10.0 |
|  | $Bi_2O_3$ | 83.0 | 82.9 | 82.9 | 81.0 | 78.5 | 78.5 | 79.0 | 78.5 |
|  | $Al_2O_3$ | 0.4 | 0.4 | 0.4 | 0.4 | 0.4 | 0.4 | 0.4 | 0.4 |
|  | MgO | — | — | — | 2.0 | — | — | — | 2.0 |
|  | CaO | — | 0.1 | — | — | 4.5 | — | — | 1.0 |
|  | SrO | — | — | 0.1 | — | — | 4.5 | — | 1.5 |
|  | BaO | — | — | — | — | — | — | 4.0 | — |
| Stability |  | ○ | ○ | ○ | ○ | ○ | ○ | ○ | ○ |
| Softening point (° C.) |  | 430 | 430 | 430 | 444 | 449 | 437 | 431 | 450 |
| Thermal expansion coefficient (×10$^{-7}$/° C.) |  | 102 | 102 | 102 | 102 | 108 | 105 | 104 | 104 |
| Water resistance (%) |  | 0.1 | 0.1 | 0.1 | 0.2 | 0.2 | 0.2 | 0.3 | 0.2 |
| Mechanical strength (MPa) |  | 82 | 87 | 86 | 89 | 90 | 91 | 88 | 90 |

TABLE 29

|  |  | Example | | | | | | | |
|---|---|---|---|---|---|---|---|---|---|
| No. |  | 251 | 252 | 253 | 254 | 255 | 256 | 257 | 258 |
| Composition (wt %) | $SiO_2$ | 1.3 | 1.3 | 1.3 | 1.3 | 1.3 | 1.3 | 1.3 | 1.3 |
|  | $B_2O_3$ | 5.3 | 5.3 | 5.3 | 5.3 | 5.3 | 5.3 | 5.3 | 5.3 |
|  | ZnO | 10.0 | 10.0 | 10.0 | 10.0 | 10.0 | 10.0 | 10.0 | 10.0 |
|  | $Bi_2O_3$ | 78.5 | 78.5 | 78.5 | 78.5 | 77.5 | 75.0 | 75.0 | 75.0 |
|  | $Al_2O_3$ | 0.4 | 0.4 | 0.4 | 0.4 | 0.4 | 0.4 | 0.4 | 0.4 |
|  | MgO | — | 3.0 | — | — | 1.0 | 2.0 | — | 8.0 |
|  | CaO | 1.5 | — | 1.5 | — | 1.0 | 3.0 | — | — |
|  | SrO | 1.0 | 1.5 | — | — | 1.5 | 3.0 | 4.0 | — |
|  | BaO | 2.0 | — | 3.0 | 4.5 | 2.0 | — | 4.0 | — |
| Stability |  | ○ | Δ | ○ | Δ | Δ | Δ | Δ | Δ |
| Softening point (° C.) |  | 439 | 450 | 437 | 431 | 445 | 449 | 438 | 450 |
| Thermal expansion coefficient (×10$^{-7}$/° C.) |  | 106 | 103 | 106 | 104 | 105 | 108 | 107 | 113.0 |
| Water resistance (%) |  | 0.3 | 0.3 | 0.5 | 0.7 | 1.6 | 1.6 | 1.6 | 1.6 |
| Mechanical strength (MPa) |  | 88 | 87 | 88 | 87 | 87 | 91 | 90 | 88 |

TABLE 30

| No. | | Example | | | Comparative Example | | | | |
|---|---|---|---|---|---|---|---|---|---|
| | | 259 | 260 | 261 | 262 | 263 | 264 | 265 | 266 |
| Composition (wt %) | $SiO_2$ | 1.3 | 1.3 | 1.3 | 1.3 | 1.3 | 1.3 | 1.3 | 1.3 |
| | $B_2O_3$ | 5.3 | 5.3 | 5.3 | 5.3 | 5.3 | 5.3 | 5.3 | 5.3 |
| | ZnO | 10.0 | 10.0 | 10.0 | 10.0 | 10.0 | 10.0 | 10.0 | 10.0 |
| | $Bi_2O_3$ | 75.0 | 75.0 | 75.0 | 73.0 | 73.0 | 73.0 | 73.0 | 73.0 |
| | $Al_2O_3$ | 0.4 | 0.4 | 0.4 | 0.4 | 0.4 | 0.4 | 0.4 | 0.4 |
| | MgO | — | — | — | 1.0 | 10.0 | — | — | — |
| | CaO | 8.0 | — | — | 3.0 | — | 10.0 | — | — |
| | SrO | — | 8.0 | — | 3.0 | — | — | 10.0 | — |
| | BaO | — | — | 8.0 | 3.0 | — | — | — | 10.0 |
| Stability | | Δ | Δ | Δ | X | X | X | X | X |
| Softening point (° C.) | | 449 | 443 | 433 | — | — | — | — | — |
| Thermal expansion coefficient ($\times 10^{-7}$/° C.) | | 113.0 | 108.0 | 107.0 | — | — | — | — | — |
| Water resistance (%) | | 1.6 | 1.6 | 1.7 | — | — | — | — | — |
| Mechanical strength (MPa) | | 90 | 90 | 86 | — | — | — | — | — |

Though MgO, CaO, SrO and BaO are not always essential components, stable glass is formed if one or more of them is contained. As clearly shown in Comparative Examples Nos. 262 to 266, when the total content of MgO, CaO, SrO and BaO was 10 wt %, the glass composition was devitrified in the manufacture thereof, thereby the glass composition was not obtained with stability. Accordingly, the total content of MgO, CaO, SrO and BaO is preferably 8 wt % or less.

Further, as clearly understood from Examples Nos. 255 to 261, when the total content of MgO, CaO, SrO and BaO was 5.5 wt % to 8.0 wt %, the water resistance was 1.6% or more, which exceeded 1.5%. For the purpose of improving the water resistance of the glass composition, the total content of MgO, CaO, SrO and BaO is preferably 4.5 wt % or less.

Further, as clearly shown in Examples Nos. 252 and 254, crystal precipitation is apt to occur in the glass in the heat treatment after the manufacture of the glass composition. In order to suppress this, it is more preferable to set the content of MgO to 2 wt % or less and the content of BaO to 4 wt % or less.

Any of MgO, CaO, SrO and BaO functions to stabilize the glass composition. In particular, it is preferable to contain CaO or SrO, and the effective content thereof is 0.1 to 4.5 wt %, respectively.

Tables 31 to 36 shows the glass compositions manufactured to make a study of the contents of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$. The glass compositions of Nos. 268 to 300 are Examples and those of Nos. 267 and 301 to 317 are Comparative Examples.

TABLE 31

| No. | | Comparative Example | Example | | | | | | | |
|---|---|---|---|---|---|---|---|---|---|---|
| | | 267 | 268 | 269 | 270 | 271 | 272 | 273 | 274 | 275 |
| Composition (wt %) | $SiO_2$ | 1.1 | 1.1 | 1.1 | 1.1 | 1.1 | 1.1 | 1.1 | 1.1 | 1.1 |
| | $B_2O_3$ | 7.0 | 7.0 | 7.0 | 7.0 | 7.0 | 7.0 | 7.0 | 7.0 | 7.0 |
| | ZnO | 10.8 | 10.8 | 10.8 | 10.8 | 10.8 | 10.8 | 10.8 | 10.8 | 10.8 |
| | $Bi_2O_3$ | 79.1 | 79.0 | 79.0 | 79.0 | 79.0 | 79.0 | 79.0 | 79.0 | 79.0 |
| | $Al_2O_3$ | 0.2 | 0.2 | 0.2 | 0.2 | 0.2 | 0.2 | 0.2 | 0.2 | 0.2 |
| | $Na_2O$ | 1.8 | 1.8 | 1.8 | 1.8 | 1.8 | 1.8 | 1.8 | 1.8 | 1.8 |
| | $Sc_2O_3$ | — | 0.1 | — | — | — | — | — | — | — |
| | $Y_2O_3$ | — | — | 0.1 | — | — | — | — | — | — |
| | $La_2O_3$ | — | — | — | 0.1 | — | — | — | — | — |
| | $CeO_2$ | — | — | — | — | 0.1 | — | — | — | — |
| | $Pr_2O_3$ | — | — | — | — | — | 0.1 | — | — | — |
| | $Nd_2O_3$ | — | — | — | — | — | — | 0.1 | — | — |
| | $Sm_2O_3$ | — | — | — | — | — | — | — | 0.1 | — |
| | $Eu_2O_3$ | — | — | — | — | — | — | — | — | 0.1 |
| Stability | | ○ | ○ | ○ | ○ | ○ | ○ | ○ | ○ | ○ |
| Softening point (° C.) | | 414 | 413 | 414 | 413 | 415 | 413 | 413 | 412 | 415 |
| Thermal expansion coefficient ($\times 10^{-7}$/° C.) | | 113 | 112 | 113 | 113 | 113 | 112 | 113 | 114 | 113 |
| Water resistance (%) | | 0.3 | 0.2 | 0.3 | 0.3 | 0.3 | 0.3 | 0.2 | 0.2 | 0.3 |
| Mechanical strength (MPa) | | 73 | 82 | 83 | 82 | 85 | 84 | 82 | 81 | 83 |

TABLE 32

| | | Example | | | | | | | |
|---|---|---|---|---|---|---|---|---|---|
| No. | | 276 | 277 | 278 | 279 | 280 | 281 | 282 | 283 |
| Composition (wt %) | $SiO_2$ | 1.1 | 1.1 | 1.1 | 1.1 | 1.1 | 1.1 | 1.1 | 1.1 |
| | $B_2O_3$ | 7.0 | 7.0 | 7.0 | 7.0 | 7.0 | 7.0 | 7.0 | 7.0 |
| | ZnO | 10.8 | 10.8 | 10.8 | 10.8 | 10.8 | 10.8 | 10.8 | 10.8 |
| | $Bi_2O_3$ | 79.0 | 79.0 | 79.0 | 79.0 | 79.0 | 79.0 | 79.0 | 79.0 |
| | $Al_2O_3$ | 0.2 | 0.2 | 0.2 | 0.2 | 0.2 | 0.2 | 0.2 | 0.2 |
| | $Na_2O$ | 1.8 | 1.8 | 1.8 | 1.8 | 1.8 | 1.8 | 1.8 | 1.8 |
| | $Gd_2O_3$ | 0.1 | — | — | — | — | — | — | — |
| | $Tb_2O_3$ | — | 0.1 | — | — | — | — | — | — |
| | $Dy_2O_3$ | — | — | 0.1 | — | — | — | — | — |
| | $Ho_2O_3$ | — | — | — | 0.1 | — | — | — | — |
| | $Er_2O_3$ | — | — | — | — | 0.1 | — | — | — |
| | $Tm_2O_3$ | — | — | — | — | — | 0.1 | — | — |
| | $Yb_2O_3$ | — | — | — | — | — | — | 0.1 | — |
| | $Lu_2O_3$ | — | — | — | — | — | — | — | 0.1 |
| Stability | | ○ | ○ | ○ | ○ | ○ | ○ | ○ | ○ |
| Softening point (° C.) | | 415 | 413 | 413 | 412 | 415 | 414 | 413 | 412 |
| Thermal expansion coefficient ($\times 10^{-7}$/° C.) | | 113 | 113 | 113 | 112 | 113 | 112 | 114 | 113 |
| Water resistance (%) | | 0.3 | 0.2 | 0.3 | 0.3 | 0.3 | 0.2 | 0.3 | 0.3 |
| Mechanical strength (MPa) | | 84 | 82 | 83 | 81 | 85 | 84 | 83 | 81 |

TABLE 33

| | | Example | | | | | | | | |
|---|---|---|---|---|---|---|---|---|---|---|
| No. | | 284 | 285 | 286 | 287 | 288 | 289 | 290 | 291 | 292 |
| Composition (wt %) | $SiO_2$ | 1.1 | 1.1 | 1.1 | 1.1 | 1.1 | 1.1 | 1.1 | 1.1 | 1.1 |
| | $B_2O_3$ | 6.7 | 6.6 | 6.6 | 6.6 | 6.6 | 6.6 | 6.6 | 6.6 | 6.6 |
| | ZnO | 10.5 | 10.3 | 10.3 | 10.3 | 10.3 | 10.3 | 10.3 | 10.3 | 10.3 |
| | $Bi_2O_3$ | 76.6 | 75.1 | 75.1 | 75.1 | 75.1 | 75.1 | 75.1 | 75.1 | 75.1 |
| | $Al_2O_3$ | 0.2 | 0.2 | 0.2 | 0.2 | 0.2 | 0.2 | 0.2 | 0.2 | 0.2 |
| | $Na_2O$ | 1.7 | 1.7 | 1.7 | 1.7 | 1.7 | 1.7 | 1.7 | 1.7 | 1.7 |
| | $Sc_2O_3$ | 0.2 | 5.0 | — | — | — | — | — | — | — |
| | $Y_2O_3$ | 0.2 | — | 5.0 | — | — | — | — | — | — |
| | $La_2O_3$ | 0.2 | — | — | 5.0 | — | — | — | — | — |
| | $CeO_2$ | 0.2 | — | — | — | 5.0 | — | — | — | — |
| | $Pr_2O_3$ | 0.2 | — | — | — | — | 5.0 | — | — | — |
| | $Nd_2O_3$ | 0.2 | — | — | — | — | — | 5.0 | — | — |
| | $Sm_2O_3$ | 0.2 | — | — | — | — | — | — | 5.0 | — |
| | $Eu_2O_3$ | 0.2 | — | — | — | — | — | — | — | 5.0 |
| | $Gd_2O_3$ | 0.2 | — | — | — | — | — | — | — | — |
| | $Tb_2O_3$ | 0.2 | — | — | — | — | — | — | — | — |
| | $Dy_2O_3$ | 0.2 | — | — | — | — | — | — | — | — |
| | $Ho_2O_3$ | 0.2 | — | — | — | — | — | — | — | — |
| | $Er_2O_3$ | 0.2 | — | — | — | — | — | — | — | — |
| | $Tm_2O_3$ | 0.2 | — | — | — | — | — | — | — | — |
| | $Yb_2O_3$ | 0.2 | — | — | — | — | — | — | — | — |
| | $Lu_2O_3$ | 0.2 | — | — | — | — | — | — | — | — |
| Stability | | ○ | ○ | ○ | ○ | ○ | ○ | ○ | ○ | ○ |
| Softening point (° C.) | | 429 | 436 | 438 | 439 | 437 | 436 | 438 | 437 | 437 |
| Thermal expansion coefficient ($\times 10^{-7}$/° C.) | | 110 | 108 | 108 | 108 | 109 | 107 | 109 | 107 | 108 |
| Water resistance (%) | | 0.2 | 0.2 | 0.1 | 0.1 | 0.1 | 0.2 | 0.1 | 0.2 | 0.2 |
| Mechanical strength (MPa) | | 92 | 88 | 89 | 90 | 89 | 91 | 88 | 89 | 88 |

TABLE 34

| | | Example | | | | | | | |
|---|---|---|---|---|---|---|---|---|---|
| No. | | 293 | 294 | 295 | 296 | 297 | 298 | 299 | 300 |
| Composition (wt %) | $SiO_2$ | 1.1 | 1.1 | 1.1 | 1.1 | 1.1 | 1.1 | 1.1 | 1.1 |
| | $B_2O_3$ | 6.6 | 6.6 | 6.6 | 6.6 | 6.6 | 6.6 | 6.6 | 6.6 |
| | ZnO | 10.3 | 10.3 | 10.3 | 10.3 | 10.3 | 10.3 | 10.3 | 10.3 |
| | $Bi_2O_3$ | 75.1 | 75.1 | 75.1 | 75.1 | 75.1 | 75.1 | 75.1 | 75.1 |
| | $Al_2O_3$ | 0.2 | 0.2 | 0.2 | 0.2 | 0.2 | 0.2 | 0.2 | 0.2 |
| | $Na_2O$ | 1.7 | 1.7 | 1.7 | 1.7 | 1.7 | 1.7 | 1.7 | 1.7 |

TABLE 34-continued

| | | Example | | | | | | | |
|---|---|---|---|---|---|---|---|---|---|
| No. | | 293 | 294 | 295 | 296 | 297 | 298 | 299 | 300 |
| | $Gd_2O_3$ | 5.0 | — | — | — | — | — | — | — |
| | $Tb_2O_3$ | — | 5.0 | — | — | — | — | — | — |
| | $Dy_2O_3$ | — | — | 5.0 | — | — | — | — | — |
| | $Ho_2O_3$ | — | — | — | 5.0 | — | — | — | — |
| | $Er_2O_3$ | — | — | — | — | 5.0 | — | — | — |
| | $Tm_2O_3$ | — | — | — | — | — | 5.0 | — | — |
| | $Yb_2O_3$ | — | — | — | — | — | — | 5.0 | — |
| | $Lu_2O_3$ | — | — | — | — | — | — | — | 5.0 |
| Stability | | ○ | ○ | ○ | ○ | ○ | ○ | ○ | ○ |
| Softening point (° C.) | | 437 | 436 | 438 | 437 | 436 | 438 | 437 | 437 |
| Thermal expansion coefficient ($\times 10^{-7}/°$ C.) | | 107 | 109 | 108 | 108 | 108 | 109 | 107 | 108 |
| Water resistance (%) | | 0.1 | 0.2 | 0.1 | 0.2 | 0.2 | 0.2 | 0.1 | 0.2 |
| Mechanical strength (MPa) | | 88 | 89 | 89 | 91 | 89 | 90 | 91 | 92 |

TABLE 35

| | | Comparative Example | | | | | | | | |
|---|---|---|---|---|---|---|---|---|---|---|
| No. | | 301 | 302 | 303 | 304 | 305 | 306 | 307 | 308 | 309 |
| Composition (wt %) | $SiO_2$ | 1.1 | 1.1 | 1.1 | 1.1 | 1.1 | 1.1 | 1.1 | 1.1 | 1.1 |
| | $B_2O_3$ | 6.6 | 6.6 | 6.6 | 6.6 | 6.6 | 6.6 | 6.6 | 6.6 | 6.6 |
| | ZnO | 10.0 | 10.1 | 10.1 | 10.1 | 10.1 | 10.1 | 10.1 | 10.1 | 10.1 |
| | $Bi_2O_3$ | 72.4 | 73.2 | 73.2 | 73.2 | 73.2 | 73.2 | 73.2 | 73.2 | 73.2 |
| | $Al_2O_3$ | 0.2 | 0.2 | 0.2 | 0.2 | 0.2 | 0.2 | 0.2 | 0.2 | 0.2 |
| | $Na_2O$ | 1.8 | 1.8 | 1.8 | 1.8 | 1.8 | 1.8 | 1.8 | 1.8 | 1.8 |
| | $Sc_2O_3$ | 0.5 | 7.0 | — | — | — | — | — | — | — |
| | $Y_2O_3$ | 0.5 | — | 7.0 | — | — | — | — | — | — |
| | $La_2O_3$ | 0.5 | — | — | 7.0 | — | — | — | — | — |
| | $CeO_2$ | 0.5 | — | — | — | 7.0 | — | — | — | — |
| | $Pr_2O_3$ | 0.5 | — | — | — | — | 7.0 | — | — | — |
| | $Nd_2O_3$ | 0.5 | — | — | — | — | — | 7.0 | — | — |
| | $Sm_2O_3$ | 0.5 | — | — | — | — | — | — | 7.0 | — |
| | $Eu_2O_3$ | 0.5 | — | — | — | — | — | — | — | 7.0 |
| | $Gd_2O_3$ | 0.5 | — | — | — | — | — | — | — | — |
| | $Tb_2O_3$ | 0.5 | — | — | — | — | — | — | — | — |
| | $Dy_2O_3$ | 0.5 | — | — | — | — | — | — | — | — |
| | $Ho_2O_3$ | 0.5 | — | — | — | — | — | — | — | — |
| | $Er_2O_3$ | 0.5 | — | — | — | — | — | — | — | — |
| | $Tm_2O_3$ | 0.5 | — | — | — | — | — | — | — | — |
| | $Yb_2O_3$ | 0.5 | — | — | — | — | — | — | — | — |
| | $Lu_2O_3$ | 0.5 | — | — | — | — | — | — | — | — |
| Stability | | X | X | X | X | X | X | X | X | X |
| Softening point (° C.) | | — | — | — | — | — | — | — | — | — |
| Thermal expansion Coefficient ($\times 10^{-7}/°$ C.) | | — | — | — | — | — | — | — | — | — |
| Water resistance (%) | | — | — | — | — | — | — | — | — | — |
| Mechanical strength (MPa) | | — | — | — | — | — | — | — | — | — |

TABLE 36

| | | Comparative Example | | | | | | | |
|---|---|---|---|---|---|---|---|---|---|
| No. | | 310 | 311 | 312 | 313 | 314 | 315 | 316 | 317 |
| Composition (wt %) | $SiO_2$ | 1.1 | 1.1 | 1.1 | 1.1 | 1.1 | 1.1 | 1.1 | 1.1 |
| | $B_2O_3$ | 6.6 | 6.6 | 6.6 | 6.6 | 6.6 | 6.6 | 6.6 | 6.6 |
| | ZnO | 10.1 | 10.1 | 10.1 | 10.1 | 10.1 | 10.1 | 10.1 | 10.1 |
| | $Bi_2O_3$ | 73.2 | 73.2 | 73.2 | 73.2 | 73.2 | 73.2 | 73.2 | 73.2 |
| | $Al_2O_3$ | 0.2 | 0.2 | 0.2 | 0.2 | 0.2 | 0.2 | 0.2 | 0.2 |
| | $Na_2O$ | 1.8 | 1.8 | 1.8 | 1.8 | 1.8 | 1.8 | 1.8 | 1.8 |
| | $Gd_2O_3$ | 7.0 | — | — | — | — | — | — | — |
| | $Tb_2O_3$ | — | 7.0 | — | — | — | — | — | — |
| | $Dy_2O_3$ | — | — | 7.0 | — | — | — | — | — |
| | $Ho_2O_3$ | — | — | — | 7.0 | — | — | — | — |
| | $Er_2O_3$ | — | — | — | — | 7.0 | — | — | — |

TABLE 36-continued

|  |  | Comparative Example |  |  |  |  |  |  |  |
|---|---|---|---|---|---|---|---|---|---|
| No. | | 310 | 311 | 312 | 313 | 314 | 315 | 316 | 317 |
| | $Tm_2O_3$ | — | — | — | — | — | 7.0 | — | — |
| | $Yb_2O_3$ | — | — | — | — | — | — | 7.0 | — |
| | $Lu_2O_3$ | — | — | — | — | — | — | — | 7.0 |
| Stability | | X | X | X | X | X | X | X | X |
| Softening point (° C.) | | — | — | — | — | — | — | — | — |
| Thermal expansion Coefficient ($\times 10^{-7}$/° C.) | | — | — | — | — | — | — | — | — |
| Water resistance (%) | | — | — | — | — | — | — | — | — |
| Mechanical strength (MPa) | | — | — | — | — | — | — | — | — |

$Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ function to improve the mechanical strength of the glass composition.

As clearly shown in Tables 31 to 36, if the sealing member requires higher strength, it is necessary to use a glass composition containing 0.1 wt % or more of at least one of them. However, if the total content of them was 7.0 wt % or more the glass composition was devitrified in the manufacture thereof, thereby the glass composition was not obtained with stability. Accordingly, the total content of them is preferably 0.1 to 5 wt %.

Table 37 shows the glass compositions manufactured to make a study of the weight ratio of ZnO to $B_2O_3$ (ZnO/$B_2O_3$). The glass compositions of Nos. 319 to 321 are Examples and those of Nos. 318 and 322 are Comparative Examples.

TABLE 37

| | | Comparative Example | Example | | | Comparative Example |
|---|---|---|---|---|---|---|
| No. | | 318 | 319 | 320 | 321 | 322 |
| Composition (wt %) | $SiO_2$ | 2.2 | 2.3 | 1.1 | 1.2 | 1.4 |
| | $B_2O_3$ | 7.5 | 9.0 | 7.0 | 7.0 | 5.7 |
| | ZnO | 5.8 | 9.9 | 13.1 | 17.5 | 17.4 |
| | $Bi_2O_3$ | 83.4 | 75.8 | 76.3 | 72.9 | 72.9 |
| | $Al_2O_3$ | — | 0.5 | 0.1 | 0.2 | 0.6 |
| | $Na_2O$ | 1.1 | 2.0 | 1.0 | 1.2 | 2.0 |
| | CaO | — | — | 0.5 | — | — |
| | SrO | — | — | 0.8 | — | — |
| | $La_2O_3$ | — | — | 0.1 | — | — |
| | $CeO_2$ | — | 0.5 | — | — | — |
| ZnO/$B_2O_3$ | | 0.77 | 1.1 | 1.87 | 2.5 | 3.05 |
| Stability | | Δ | ○ | ○ | ○ | Δ |
| Softening point (° C.) | | 423 | 430 | 427 | 430 | 419 |
| Thermal expansion coefficient ($\times 10^{-7}$/° C.) | | 120 | 113 | 108 | 102 | 109 |
| Water resistance (%) | | 1.6 | 0.2 | 0.3 | 0.2 | 0.3 |
| Mechanical strength (MPa) | | 78 | 79 | 80 | 78 | 76 |

As clearly shown in Table 37, when the weight ratio of ZnO to $B_2O_3$ is 0.77 or 3.05, the crystal precipitation is apt to occur in the glass in the heat treatment of the glass composition after the manufacture thereof, which may possibly cause a problem in maintaining hermeticity. Accordingly, to obtain a stable glass composition that hardly causes the crystal precipitation, the weight ratio of ZnO to $B_2O_3$ is preferably controlled to 1.1 to 2.5.

Table 38 show the glass compositions manufactured to make a study of the weight ratio of $Al_2O_3$ to $SiO_2$ ($Al_2O_3$/$SiO_2$). The glass compositions of Nos. 323 to 325 are Examples and those of Nos. 326 and 327 are Comparative Examples.

TABLE 38

| | | Example | | | Comparative Example | |
|---|---|---|---|---|---|---|
| No. | | 323 | 324 | 325 | 326 | 327 |
| Composition (wt %) | $SiO_2$ | 1.6 | 1.1 | 2.0 | 2.4 | 1.0 |
| | $B_2O_3$ | 5.8 | 5.0 | 6.8 | 6.5 | 6.6 |
| | ZnO | 11.8 | 11.2 | 9.6 | 9.5 | 9.5 |
| | $Bi_2O_3$ | 78.7 | 81.3 | 78.3 | 78.9 | 79.9 |
| | $Al_2O_3$ | — | 0.2 | 1.0 | 1.8 | 2.0 |
| | $Li_2O$ | — | — | 2.0 | — | — |

TABLE 38-continued

| | | Example | | | Comparative Example | |
|---|---|---|---|---|---|---|
| No. | | 323 | 324 | 325 | 326 | 327 |
| | $Na_2O$ | — | — | — | 0.9 | 1.0 |
| | CaO | 1.8 | 0.4 | — | — | — |
| | SrO | — | 0.7 | — | — | — |
| | $La_2O_3$ | — | 0.1 | 0.3 | — | — |
| | $Gd_2O_3$ | 0.3 | — | — | — | — |

TABLE 38-continued

|  |  | Example | | | Comparative Example | |
| --- | --- | --- | --- | --- | --- | --- |
| No. |  | 323 | 324 | 325 | 326 | 327 |
| $Al_2O_3/SiO_2$ |  | 0.0 | 0.18 | 0.5 | 0.75 | 2.0 |
| Stability |  | ○ | ○ | ○ | Δ | Δ |
| Softening point (° C.) |  | 445 | 422 | 416 | 438 | 440 |
| Thermal expansion Coefficient ($\times 10^{-7}/°$ C.) |  | 102 | 104 | 115 | 106 | 107 |
| Water resistance (%) |  | 0.1 | 0.2 | 0.2 | 0.2 | 0.2 |
| Mechanical strength (MPa) |  | 88 | 80 | 76 | 81 | 85 |

As clearly shown in Table 38, when the weight ratio of $Al_2O_3$ to $SiO_2$ is 0.75 or more, the crystal precipitation is apt to occur in the glass in the heat treatment of the glass composition after the manufacture thereof, which may possibly cause a problem in maintaining hermeticity. Accordingly, to obtain a stable glass composition that hardly causes the crystal precipitation, it is important to limit the weight ratio of $Al_2O_3$ to $SiO_2$, which is preferably controlled to 0.5 or less.

Table 39 shows lead-containing glass compositions manufactured as Comparative Examples 328 to 331 to make a performance comparison with the bismuth glass composition.

TABLE 39

|  |  | Comparative Example | | | |
| --- | --- | --- | --- | --- | --- |
| No. |  | 328 | 329 | 330 | 331 |
| Composition (wt %) | $SiO_2$ | 8.4 | 2.0 | 4.2 | 2.4 |
|  | $B_2O_3$ | 7.9 | 10.7 | 15.0 | 7.6 |
|  | ZnO | 1.9 | 0.5 | 10.3 | 8.9 |
|  | PbO | 80.3 | 85.2 | 70.5 | 78.6 |
|  | $Al_2O_3$ | 1.5 | 1.1 | — | 0.4 |
|  | K2O | — | — | — | 1.0 |
|  | CaO | — | — | — | 1.1 |
|  | BaO | — | 0.5 | — | — |
| Stability |  | ○ | ○ | ○ | ○ |
| Softening point (° C.) |  | 408 | 396 | 425 | 378 |
| Thermal expansion Coefficient ($\times 10^{-7}/°$ C.) |  | 96 | 100 | 91 | 103 |
| Water resistance (%) |  | 0.5 | 0.7 | 0.3 | 1.1 |
| Mechanical strength (MPa) |  | 85 | 76 | 84 | 72 |

As clearly shown in Table 39, the glass composition for forming the sealing member according to the present invention showed the softening point of 450° C. or lower even if lead was not contained therein. Further, it also showed mechanical strength equal to that of the lead-containing glass composition and was excellent in water resistance.

By adjusting the composition ratio in the glass composition of the present invention, a desired sealing member for a PDP was obtained.

EXAMPLE 6

With the sealing member 16 comprising the glass composition manufactured in Example 5, a front plate 1 and a rear plate 8 were sealed, or an air hole 17 and a glass tube 18 were sealed to form a PDP. Except the sealing step, the manufacturing method was the same as that explained in the present embodiment.

Powder of the glass composition and a low-expansion ceramic filler were mixed in a predetermined weight ratio, to which nitrocellulose and isoamyl acetate were added to prepare a paste. The thus obtained paste containing the glass composition was applied to a sealing part 15 of the rear plate 8 by injection and provisionally baked at 350° C. Then, the front plate 1 and the rear plate 8 were stacked. A glass tube 18 was arranged at the position of an air hole 17 formed in the rear plate 8, to which the paste containing the glass composition was applied by injection. This was baked at a predetermined baking temperature for 30 minutes to perform the sealing. The baking temperature was set higher than the softening point of each glass composition by 50° C.

Table 40 shows the sealing glasses (Nos. A, B, C, D) as Examples of the present invention and a sealing member as Comparative Example (No. E), together with the composition ratio between the glass composition and the low-expansion ceramic filler comprising cordierite or zircon used in each sealing member, the thermal expansion coefficient and the baking temperature of the sealing member.

Between the sealing member 16 and the glass panel of the front plate 1 or the rear plate 8, at which the sealing is attempted, stress warpage occurs due to a difference in thermal expansion after the sealing. In order to reduce the stress warpage so as not to cause damages such as break, the thermal expansion coefficient of the sealing member 16 is preferably $60 \times 10^{-7}/°$ C. to $80 \times 10^{-7}/°$ C.

TABLE 40

|  | Example | | | | Comparative Example |
| --- | --- | --- | --- | --- | --- |
| No. | A | B | C | D | E |
| Glass composition No. | 203 | 220 | 244 | 324 | 329 |
| Composition ratio in the sealing member (wt %) | — | — | — | — | — |
| Glass composition | 60 | 60 | 55 | 50 | 55 |
| Cordierite | 40 | — | 45 | — | 45 |
| Zircon | — | 40 | — | 50 | — |
| Thermal expansion coefficient ($\times 10^{-7}/°$ C.) | 72 | 71 | 68 | 69 | 68 |
| Baking temperature (° C.) | 460 | 491 | 480 | 472 | 446 |

After the sealing, any of the sealing members 16 of Examples allowed satisfactory bonding of the front plate 1 and the rear plate 8 in the same manner as those of Comparative Examples, and showed required hermeticity. As a result, a PDP capable of lighting was manufactured.

The low softening point glass compositions described in Example 5 have the thermal expansion coefficient far greater than these. Therefore, a sealing member having a desired thermal expansion coefficient can be obtained by optionally mixing a low-expansion ceramic filler therein. For that purpose, it is necessary to mix them in a weight ratio (low-expansion ceramic filler/glass composition) of 0.01 or more. However, if the weight ratio (low-expansion ceramic filler/glass composition) exceeds 4.0, the amount of the glass composition in the sealing member becomes too small, which makes the bonding itself impossible and the hermeticity and the strength deteriorate significantly. In view of this, the weight ratio of the low-expansion ceramic filler to the glass composition is preferably 0.01 to 4.0.

As the low-expansion ceramic filler, for example, may be used at least one selected from the group consisting of cordierite, willemite, forsterite, anorthite, zircon, mullite, β-eucryptite, β-spodumene, cristobalite, barium titanate, titanium oxide, tin oxide, aluminum oxide, zirconium oxide, quartz glass and refractory glass.

INDUSTRIAL APPLICABILITY

According to the present invention, a bismuth glass composition is provided with an appropriate thermal expansion coefficient and mechanical strength, excellent water resistance and low working temperature. Since the bismuth glass composition does not contain lead, it causes less load to the environment.

The invention claimed is:

1. A Bismuth glass composition comprising 1.7 to 12 wt % of $SiO_2$, 3 to 9 wt % of $B_2O_3$, 9.5 to 19 wt % of ZnO, 62 to 80 wt % of $Bi_2O_3$ and 0.1 to 4 wt % of $Al_2O_3$, and further comprising 5 wt % or less of an oxide of Group A, 12 wt % or less of an oxide of Group B and 0.1 to 10 wt % of an oxide of Group C, wherein the oxide of Group A is at least one selected from the group consisting of $Li_2O$, $Na_2O$ and $K_2O$, the oxide of Group B is at least one selected from the group consisting of MgO, CaO, SrO and BaO, and the oxide of Group C is at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$, and the weight ratio of $Al_2O_3$ to $SiO_2$ is 0.5 or less.

2. The bismuth glass composition comprising 1.1 to 4.5 wt % of $SiO_2$, 4 to 9 wt % of $B_2O_3$, 9.5 to 18 wt % of ZnO and 72 to 85 wt % of $Bi_2O_3$ and 4 wt % or less of $Al_2O_3$, and further comprising 5 wt % or less of an oxide of Group A, 12 wt % or less of an oxide of Group B and 0.1 to 10 wt % of an oxide of Group C, wherein the oxide of group A is at least one selected from the group consisting of $Li_2O$, $Na_2O$ and $K_2O$, the oxide of Group B is at least one selected from the group consisting of MgO, CaO, SrO and BaO, the oxide of Group C is at least one selected from the group consisting of $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$, and the weight ratio of $Al_2O_3$ to $SiO_2$ is 0.5 or less.

3. The bismuth glass composition in accordance with any one of claim 1 comprising 4 wt % or less of the oxide of Group A.

4. The bismuth glass composition in accordance with claim 3, wherein the oxide of Group A comprises 2 wt % or less of $Li_2O$, 3 wt % or less of $Na_2O$ and 4 wt % or less of $K_2O$.

5. The bismuth glass composition in accordance with any one of claim 1 comprising 10 wt % or less of the oxide of Group B.

6. The bismuth glass composition in accordance with claim 5, wherein the oxide of Group B comprises 5 wt % or less of MgO, 6 wt % or less of CaO, 8 wt % or less of SrO and 10 wt % or less of BaO.

7. The bismuth glass composition in accordance with any one of claims 1 to 2 to 6 comprising 0.1 to 5 wt % of the oxide of Group C.

8. The bismuth glass composition in accordance with claim 2 or 3 comprising 0.1 to 2 wt % of $Al_2O_3$.

9. The bismuth glass composition in accordance with any one of claims 2 or 3 comprising 8 wt % or less of the oxide of Group B.

10. The bismuth glass composition in accordance with claim 9, wherein the oxide of Group B comprises 2 wt % or less of MgO, 0.1 to 4.5 wt % of CaO, 0.1 to 4.5 wt % of SrO and 4 wt % or less of BaO.

11. The bismuth glass composition in accordance with any one of claims 1 and 2 to 6, wherein the weight ratio of ZnO to $B_2O_3$ is 0.8 to 2.8.

12. The bismuth glass composition in accordance with any one of claims 2 or 3, wherein the weight ratio of ZnO to $B_2O_3$ is 1.1 to 2.5.

13. A sealing member for a magnetic head comprising the bismuth glass composition in accordance with any one of claims 1 and 2 to 6.

14. A sealing member for a plasma display panel comprising the bismuth glass composition in accordance with any one of claims 2 or 3.

15. The sealing member for a plasma display panel in accordance with claim 14 further comprising a low-expansion ceramic filler in a weight ratio of 0.01 to 4 with respect to the bismuth glass composition.

16. The sealing member for a plasma display panel in accordance with claim 15, wherein the low-expansion ceramic filler is at least one selected from the group consisting of cordierite, willemite, forsterite, anorthite, zircon, mullite, β-eucryptite, β-spodumene, cristobalite, barium titanate, titanium oxide, tin oxide, aluminum oxide, zirconium oxide and quartz glass.

17. A magnetic head comprising a pair of magnetic core halves, at least one of which being provided with a coil groove, a magnetic gap member interposed between surfaces of the magnetic core halves facing to a magnetic gap, and the sealing member in accordance with claim 13 for bonding the pair of magnetic core halves.

18. The magnetic head in accordance with claim 17 further comprising a magnetic metal film on at least one of the surfaces facing to the magnetic gap.

19. The magnetic head in accordance with claim 17, wherein each of the paired magnetic core halves comprises a pair of nonmagnetic substrates and a magnetic metal film sandwiched between the nonmagnetic substrates.

20. A magnetic recording/reproducing device comprising the magnetic head in accordance with claim 17 to perform recording and reproducing information to and from a magnetic information recording medium.

21. A plasma display panel comprising a front plate and a rear plate facing to each other, display electrodes and address electrodes arranged between the front plate and the rear plate, barrier ribs for isolating the address electrodes, dielectric layers covering the surfaces of the display electrodes and the address electrodes, respectively, and the sealing a member in accordance with of claim 14 for bonding the peripheries of the front plate and the rear plate.

22. The plasma display panel in accordance with claim 21 provided with an air hole formed in the front plate or the rear plate, further comprising a glass tube communicating with the air hole, wherein an opening end of the air hole and an end of the glass tube are bonded with the sealing member.

23. The bismuth glass composition in accordance with claim 2, wherein said bismuth glass composition has a thermal expansion coefficient of $60 \times 10^{-7}/°C$. to $80 \times 10^{-7}/°C$.

* * * * *

UNITED STATES PATENT AND TRADEMARK OFFICE
CERTIFICATE OF CORRECTION

PATENT NO. : 7,407,902 B2  
APPLICATION NO. : 10/509491  
DATED : August 5, 2008  
INVENTOR(S) : Shinya Hasegawa et al.

Page 1 of 1

It is certified that error appears in the above-identified patent and that said Letters Patent is hereby corrected as shown below:

In Column 53, Line 37 (Claim 2), change "$_{Nd2}O_3$," to --$Nd_2O_3$--;

In Column 54, Line 9 (Claim 12), change "claims 2 or 3" to --claims 2 to 3--; and Line 50 (Claim 21), change "sealing a member" to --sealing member--.

Signed and Sealed this

Fifth Day of May, 2009

JOHN DOLL  
*Acting Director of the United States Patent and Trademark Office*